US012735206B2

(12) United States Patent
Seino et al.

(10) Patent No.: US 12,735,206 B2
(45) Date of Patent: Sep. 15, 2026

(54) UNMANNED AIRCRAFT, AND METHOD FOR CONTROLLING UNMANNED AIRCRAFT

(71) Applicants: Kubota Corporation, Osaka (JP); ISHIKAWA ENERGY RESEARCH CO., LTD., Ota (JP)

(72) Inventors: Kohei Seino, Sakai (JP); Hiroyuki Nagashima, Ota (JP)

(73) Assignees: KUBOTA CORPORATION, Osaka (JP); ISHIKAWA ENERGY RESEARCH CO., LTD., Gunma (JP)

( * ) Notice: Subject to any disclaimer, the term of this patent is extended or adjusted under 35 U.S.C. 154(b) by 0 days.

(21) Appl. No.: 19/245,681

(22) Filed: Jun. 23, 2025

(65) Prior Publication Data

US 2025/0313360 A1 Oct. 9, 2025

Related U.S. Application Data

(63) Continuation of application No. PCT/JP2022/048187, filed on Dec. 27, 2022.

(51) Int. Cl.

| | |
|---|---|
| ***B64U 30/296*** | (2023.01) |
| ***B64U 10/14*** | (2023.01) |
| ***B64U 50/11*** | (2023.01) |
| ***B64U 50/19*** | (2023.01) |
| ***B64U 101/40*** | (2023.01) |

(52) U.S. Cl.

CPC ........... *B64U 30/296* (2023.01); *B64U 10/14* (2023.01); *B64U 50/11* (2023.01); *B64U 50/19* (2023.01); *B64U 2101/40* (2023.01)

(58) Field of Classification Search

None

See application file for complete search history.

(56) References Cited

U.S. PATENT DOCUMENTS

| | | | | |
|---|---|---|---|---|
| 12,172,767 | B2 * | 12/2024 | Resnick | B64D 27/402 |
| 2019/0263519 | A1 | 8/2019 | Argus | |
| 2021/0016880 | A1 | 1/2021 | Ishikawa et al. | |
| 2023/0139693 | A1 * | 5/2023 | Hofi | B64U 50/19 701/3 |
| 2023/0322423 | A1 | 10/2023 | Kinoshita et al. | |

(Continued)

FOREIGN PATENT DOCUMENTS

| | | | |
|---|---|---|---|
| CN | 113212754 | A | 8/2021 |
| EP | 2762704 | A1 | 8/2014 |

(Continued)

*Primary Examiner* — Arfan Y. Sinaki

(74) *Attorney, Agent, or Firm* — Keating & Bennett, LLP

(57) ABSTRACT

An unmanned aerial vehicle includes a plurality of rotors, a first type of rotation driver to drive one or more first rotors included in the plurality of rotors, a second type of rotation driver to drive one or more second rotors included in the plurality of rotors, and a controller configured or programmed to control rotation of the plurality of rotors by controlling the first type of rotation driver and the second type of rotation driver. The controller, when performing a landing operation, is configured or programmed to generate a difference between a first thrust that is a sum of thrust generated by the one or more first rotors, and a second thrust that is a sum of thrust generated by the one or more second rotors, smaller than that during hovering.

17 Claims, 16 Drawing Sheets

(56) References Cited

U.S. PATENT DOCUMENTS

| | | | | |
|---|---|---|---|---|
| 2024/0116626 | A1* | 4/2024 | Giannini ................ | B64U 10/20 |
| 2025/0313354 | A1* | 10/2025 | Seino ..................... | B64D 17/80 |

FOREIGN PATENT DOCUMENTS

| | | | |
|---|---|---|---|
| JP | 5508604 | B2 | 6/2014 |
| JP | 2019059362 | A | 4/2019 |
| JP | 2022104737 | A | 7/2022 |

* cited by examiner

10

22
ROTOR
200
IMPLEMENT
ROTOR
12
MOTOR
14
76
POWER SUPPLY
ESC
16
27
9
4a
4b
DRIVETRAIN
POWER BUFFER
CONTROLLER
SENSORS
COMMUNICATION DEVICE
4c
INTERNAL COMBUSTION ENGINE
ELECTRIC GENERATOR
7a
8
FUEL TANK
7b
GROUND STATION
6

UNMANNED AIRCRAFT, AND METHOD FOR CONTROLLING UNMANNED AIRCRAFT

CROSS REFERENCE TO RELATED APPLICATIONS

This application claims the benefit of priority to Continuation Application of PCT Application No. PCT/JP2022/048187 filed on Dec. 27, 2022. The entire contents of this application are hereby incorporated herein by reference.

BACKGROUND OF THE INVENTION

1. Field of the Invention

The present disclosure relates to unmanned aerial vehicles and control methods for unmanned aerial vehicles.

2. Description of the Related Art

An unmanned aerial vehicle (UAV) is an aircraft that structurally cannot accommodate human occupants and is capable of flight through remote control or autonomous operation. A rotary-wing type unmanned aerial vehicle is a UAV that generates lift using propellers, namely rotary wings, which rotate around an axis. A small unmanned aerial vehicle including multiple rotary wings (Multi-Rotor UAV) is also called a "drone", "multirotor", or "multicopter", and is widely used for applications including aerial photography, surveying, logistics, and agricultural spraying.

Japanese Patent Application Publication No. 2022-104737 describes an unmanned aerial vehicle (unmanned flying body) that changes its flight position in coordination with the operation of an agricultural machine.

Japanese Patent Application Publication No. 2019-59362 describes an unmanned aerial vehicle (autonomous flying apparatus) capable of increasing payload and continuous flight time, as well as accurately adjusting its position and attitude during flight.

SUMMARY OF THE INVENTION

The maximum payload capacity (payload) and flight duration of unmanned aerial vehicles may be insufficient depending on the application, and further improvements are desired.

Example embodiments of the present disclosure provide unmanned aerial vehicles suitable for agricultural applications, capable of increasing payload and/or flight duration.

A non-limiting example embodiment of the present disclosure provides an unmanned aerial vehicle including a plurality of rotors, a first type of rotation driver to drive one or more first rotors included in the plurality of rotors, a second type of rotation driver to drive one or more second rotors included in the plurality of rotors, and a controller configured or programmed to control rotation of the plurality of rotors by controlling the first type of rotation driver and the second type of rotation driver, wherein the controller, when performing a landing operation, is configured or programmed to generate a difference between a first thrust that is a sum of thrust generated by the one or more first rotors, and a second thrust that is a sum of thrust generated by the one or more second rotors, smaller than that during hovering.

A non-limiting example embodiment of the present disclosure provides a control method for controlling an unmanned aerial vehicle including a plurality of rotors, the method including controlling rotation of the plurality of rotors by controlling a first type of rotation driver to drive one or more first rotors included in the plurality of rotors and a second type of rotation driver to drive one or more second rotors included in the plurality of rotors, and when performing a landing operation, generating a difference between a first thrust that is a sum of thrust generated by the one or more first rotors, and a second thrust that is a sum of thrust generated by the one or more second rotors, smaller than that during hovering.

According to example embodiments of unmanned aerial vehicles and control methods for unmanned aerial vehicles of the present disclosure, it is possible to realize unmanned aerial vehicles suitable for agricultural applications, capable of increasing payload and/or flight duration.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Unmanned aerial vehicles each include a plurality of rotors and a rotation driver to rotate the rotors (hereinafter referred to as "propellers"). Hereinafter, such an unmanned aerial vehicle is referred to as a "multicopter".

Figure 1A:
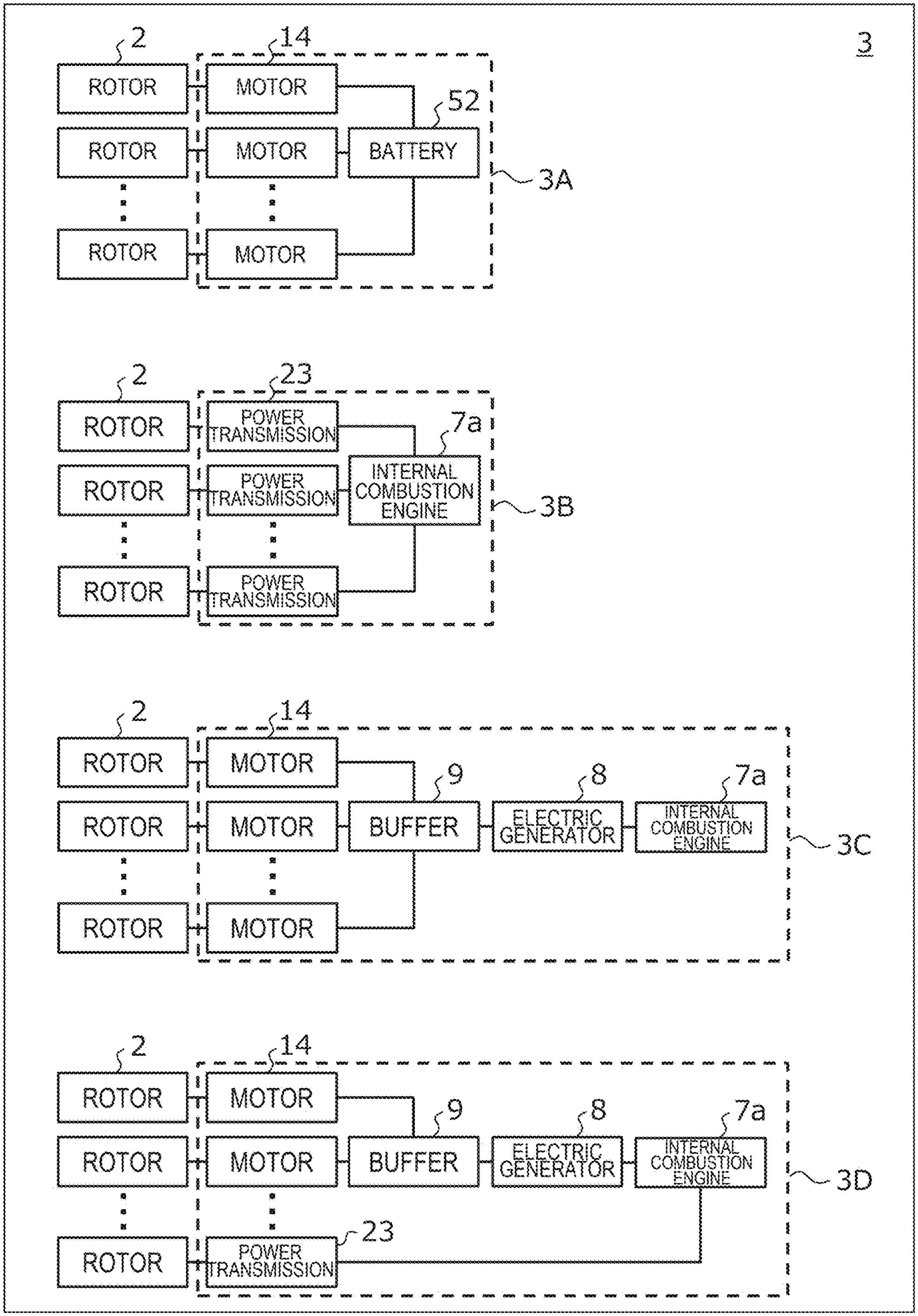
FIG. 1A is a block diagram schematically showing several examples of rotation drivers to rotate rotors in an unmanned aerial vehicle including a plurality of rotors.

The configuration of rotation drivers included in multicopters exists in various forms. FIG. 1A is a schematic block diagram showing four examples of rotation driver 3 according to example embodiments of the present disclosure.

The first rotation driver 3A shown in FIG. 1A includes a plurality of electric motors (hereinafter referred to as "motors") 14 that rotate a plurality of rotors 2, and a battery 52 that stores electric power to be supplied to each motor 14. The battery 52 is, for example, a secondary battery such as a polymer-type lithium-ion battery. Each rotor 2 is connected to the output shaft of its corresponding motor 14 and is rotated by the motor 14. To increase payload and/or flight duration, it is necessary to increase the power storage capacity of battery 52. While the power storage capacity of battery 52 can be increased by making battery 52 larger, enlarging battery 52 leads to an increase in weight.

The second rotation driver 3B shown in FIG. 1A includes a power transmission system 23 mechanically connected to rotor 2, and an internal combustion engine 7*a* that provides driving force (torque) to power transmission system 23. The power transmission system 23 includes mechanical components such as gears or belts and transmits torque from the output shaft of internal combustion engine 7*a* to rotor 2. The internal combustion engine 7*a* can efficiently generate mechanical energy through fuel combustion. Examples of internal combustion engine 7*a* may include gasoline engines, diesel engines, and hydrogen engines. Additionally, the number of internal combustion engines 7*a* included in rotation driver 3B is not limited to one.

The third rotation driver 3C shown in FIG. 1A includes a plurality of motors 14, a power buffer 9 that stores electric power to be supplied to each motor 14, an electric generator 8 such as an alternator that generates electric power, and an internal combustion engine 7*a* that provides mechanical energy for power generation to the electric generator 8. While a typical example of power buffer 9 is a battery such as a secondary battery, it may also be a capacitor. In the third rotation driver 3C, even when the power buffer 9 does not have a large power storage capacity, it is possible to increase payload and/or flight duration because the electric generator 8 generates electric power using the driving force (mechanical energy) of internal combustion engine 7*a*. This type of driver is called "series hybrid driver". The electric generator 8 and internal combustion engine 7*a* in a series hybrid driver are called a "range extender" as they extend the flight distance of the multicopter.

The fourth rotation driver 3D shown in FIG. 1A includes a plurality of motors 14, a power buffer 9 that stores electric power to be supplied to each motor 14, an electric generator 8 such as an alternator that generates electric power, an internal combustion engine 7*a* that provides driving force to the electric generator 8 for power generation, a power transmission system 23 that transmits driving force generated by the internal combustion engine 7*a* to the rotor 2 to rotate the rotor 2. At least one rotor 2 of the plurality of rotors 2 is rotated by the internal combustion engine 7*a*, while other rotors 2 are rotated by the motor 14. In the fourth rotation driver 3D, since mechanical energy generated by internal combustion engine 7*a* can be utilized for rotor rotation without conversion to electrical energy, energy utilization efficiency can be enhanced. This type of driver is called "parallel hybrid driver".

Figure 1B:
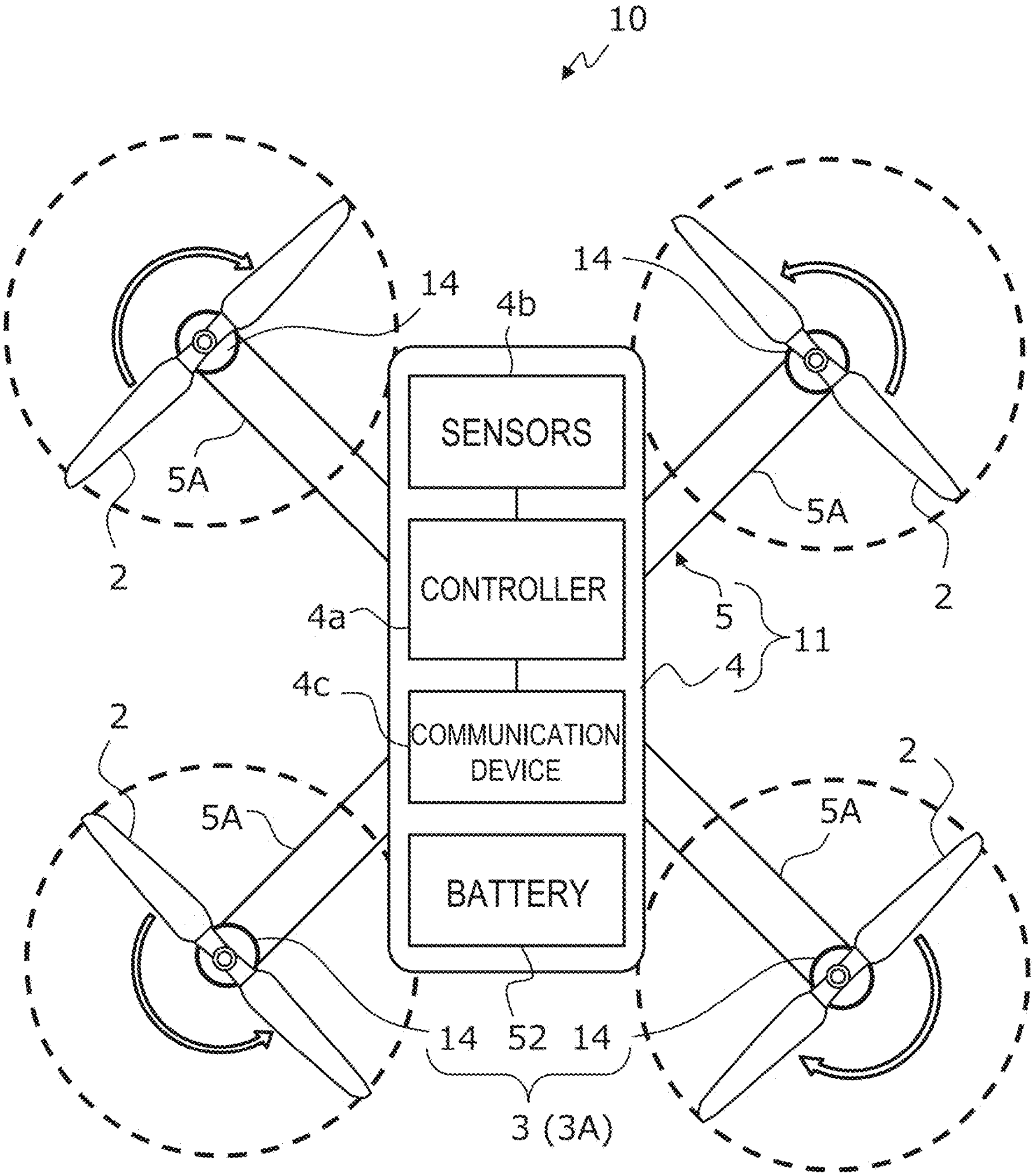
FIG. 1B is a plan view schematically showing one example of a basic configuration of an unmanned aerial vehicle including a plurality of rotors.
Figure 1C:
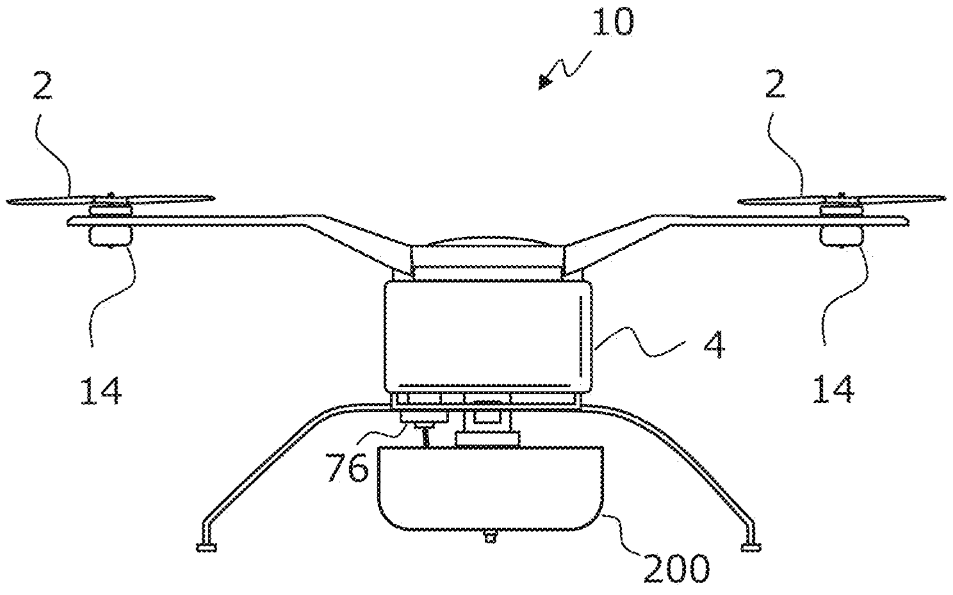
FIG. 1C is a side view schematically showing one example of a basic configuration of an unmanned aerial vehicle including a plurality of rotors.

FIG. 1B is a plan view schematically showing a basic configuration example of multicopter 10. In the configuration example of FIG. 1B, a rotation driver 3 includes the first rotation driver 3A shown in FIG. 1A. That is, in this example, rotation driver 3 (3A) includes motors 14 and a battery 52. FIG. 1C is a side view schematically showing the multicopter 10.

A multicopter 10 shown in FIGS. 1B and 1C includes a plurality of rotors 2, a main body 4, and a body frame 5 that supports rotors 2 and main body 4. The body frame 5 supports the main body 4 at its central portion and supports the plurality of rotors 2 rotatably at the plurality of arms 5A extending outward from the central portion. The motors 14 that rotate rotors 2 are provided near the ends of each arm 5A. The main body 4 and body frame 5 may be collectively referred to as "body 11".

In the example of FIG. 1B, the multicopter 10 is a quad-type multicopter (quadcopter) including four rotors 2, for example. The rotors 2 positioned on the same diagonal line rotate in the same direction (clockwise or counterclockwise), while rotors 2 positioned on different diagonal lines rotate in opposite directions.

The main body 4 includes a controller 4*a* configured or programmed to control the operation of devices and components mounted on multicopter 10, sensors 4*b* connected to the controller 4*a*, a communication device 4*c* connected to the controller 4*a*, and a battery 52.

The controller 4*a* may be configured or programmed to include, for example, a flight controller such as a flight controller and a higher-level computer (companion computer). The companion computer may perform advanced computational processing such as image processing, obstacle detection, and obstacle avoidance based on sensor data acquired by the sensors 4*b*.

The sensors 4*b* may include an acceleration sensor, angular velocity sensor, geomagnetic sensor, atmospheric pressure sensor, altitude sensor, temperature sensor, flow sensor, imaging device, laser sensor, ultrasonic sensor, obstacle contact sensor, and GNSS (Global Navigation Satellite System) receiver. The acceleration sensor and angular velocity sensor may be mounted on the main body 4 as components of an IMU (Inertial Measurement Unit). Examples of laser sensors may include a laser range finder used to measure distance to the ground, and 2D or 3D LiDAR (light detection and ranging).

The communication device 4*c* may include a wireless communication module for signal transmission and reception with a ground-based transmitter or ground control station (GCS) via an antenna, and a mobile communication module that utilizes cellular communication networks. The communication device 4*c* is configured to receive signals such as control commands transmitted from the ground and transmit sensor data such as image data acquired by sensors 4*b* as telemetry information. The communication device 4*c* may also include functions for communication between multicopters and satellite communication capabilities. The controller 4*a* may connect to computers in the cloud through the communication device 4*c*. The computer in the cloud may execute part or all of the functions of the companion computer.

A battery 52 is a secondary battery that is configured to store electric power through charging and supply electric power to motors 14 through discharging. Through the operation of battery 52 and the plurality of motors 14, a plurality of rotors 2 can be rotationally driven to generate desired thrust.

Each of the plurality of rotors 2 generally includes a plurality of blades with fixed pitch angles and generates thrust through rotation. The pitch angles may be variable. Not all of the plurality of rotors 2 need to have the same diameter (propeller diameter), and one or more rotors 2 may have a larger diameter than other rotors 2. The thrust (static thrust) generated by rotating the rotor 2 is generally proportional to the cube of the rotor's diameter. Therefore, when the rotors 2 of different diameters are included, the rotors 2 with relatively large diameters may be called "main rotors" and the rotors 2 with relatively small diameters may be called "sub-rotors". Regardless of the size of the diameter, the rotors 2 capable of generating relatively large thrust and the rotors 2 capable of generating relatively small thrust may be included depending on the configuration of rotation driver 3. In such case, the rotors 2 capable of generating relatively large thrust may be called "main rotors" and the rotors 2 capable of generating relatively small thrust may be called "sub-rotors". For example, the rotors 2 that generate relatively large thrust per rotation may be called "main rotors" and the rotors 2 that generate relatively small thrust per rotation may be called "sub-rotors". In one example, main rotors may be positioned more inward than sub-rotors. In other words, the rotors 2 may be positioned such that the distance from the center of the body to the rotation axis of each main rotor is shorter than the distance from the center to the rotation axis of each sub-rotor.

In this example, the rotation driver 3 includes a plurality of motors 14. As mentioned above, the rotation driver 3 may include the internal combustion engine 7*a*.

Figure 1D:
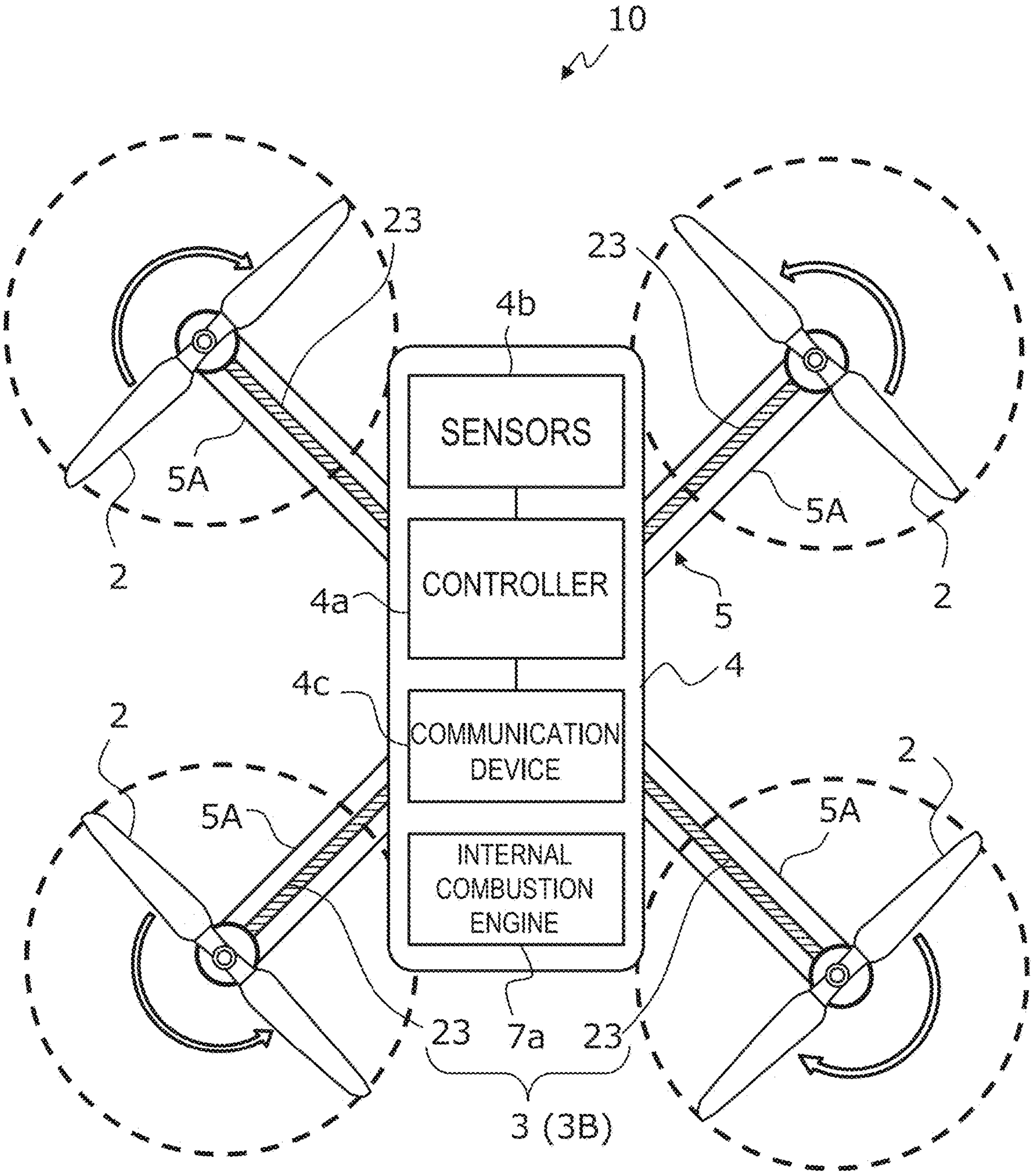
FIG. 1D is a plan view schematically showing another example of a basic configuration of an unmanned aerial vehicle including a plurality of rotors.

FIG. 1D is a plan view schematically showing a basic configuration example of a multicopter 10 including the second rotation driver 3B. In the example shown in FIG. 1D, the internal combustion engine 7*a* is supported by the main body 4. In this example, the driving force generated by internal combustion engine 7*a* is transmitted to the plurality of rotors 2 through a plurality of power transmission systems 23 to rotate each rotor 2. The controller 4*a* may change the rotational speed of individual rotors 2 by controlling each power transmission system 23. Rotation driver 3B may include a mechanism for changing the pitch angle of blades of each of the plurality of rotors 2. In that case, the controller 4*a* may adjust the lift generated by each rotor 2 by controlling that mechanism to change the blade pitch angles.

In a "parallel hybrid driver" where some of the plurality of rotors 2 are rotated by the internal combustion engine 7*a* and other rotors 2 are rotated by the motors 14, the internal combustion engine 7*a* and battery 52 are supported by the main body 4. At least one of the plurality of rotors 2 is connected to the internal combustion engine 7*a* through the power transmission system 23, and other rotors 2 are connected to the motors 14.

In such a parallel hybrid driver, the diameter of one or more rotors 2 rotated by the internal combustion engine 7*a* may be larger than the diameter of other rotors 2 rotated by the motors 14. In other words, the internal combustion engine 7*a* may be used to rotate the main rotors and the motors 14 may be used to rotate the sub-rotors. In such case, the main rotors are mainly used to generate thrust, and the sub-rotors are used to both generate thrust and attitude control. The main rotors may be called "booster rotors" and the sub-rotors may be called "attitude control rotors".

In the parallel hybrid driver, the internal combustion engine is used for both thrust generation and power generation. By selectively transmitting driving force (torque) generated by the internal combustion engine to either or both of the rotor and electric generator, it is possible to achieve balanced thrust generation and power generation.

When a multicopter includes an internal combustion engine and uses the internal combustion engine for at least one of thrust generation and power generation, this contributes to increased payload and flight duration. It is desirable to perform attitude control of the multicopter by rotating propellers using motors, which have superior response characteristics compared to internal combustion engines. Therefore, in applications where accurate attitude control of the multicopter is required, it is desirable to adopt parallel hybrid drive or series hybrid drive to increase payload and flight duration. Note that when the rotation driver 3 includes a mechanism for changing the pitch angle of blades of each of the plurality of the rotors 2, the attitude can also be adjusted by changing the pitch angle of each blade.

Through increased payload and flight duration, the applications of multicopters can be further expanded. For example, in the agricultural field, multicopters are currently being used for agricultural chemical spraying or crop growth monitoring. Various agricultural work can be performed from the air by connecting various ground work machines (hereinafter may be simply referred to as "work machines") to the multicopter. Agricultural work machines are sometimes referred to as "implements". Examples of implements may include sprayers for spraying chemicals on crops, mowers, seeders, spreaders (fertilizer applicators), rakes, balers, harvesters, plows, harrows, or rotary tillers. Work vehicles such as tractors are not included in "implements" in this disclosure.

In the example shown in FIG. 1C, an implement 200 capable of dispersing substances such as agricultural chemicals or fertilizers onto a field or crops in the field is connected to multicopter 10. Increased payload and flight duration enable the implement 200 to achieve a larger size and/or multi-functionality. For example, by changing the implement 200 connected to multicopter 10, various ground operations (agricultural work) including liquid application, granular application, fertilization, thinning, weeding, transplanting, direct seeding, and harvesting can be performed. The implement 200 may be including mechanisms such as robotic hands. In that case, a single implement 200 can perform various ground operations. When the implement 200 includes space large enough to store materials, the implement 200 can also transport agricultural materials or harvested crops over a wide area. There are various forms of connecting the implement 200 to the multicopter 10. The multicopter 10 may suspend and tow the implement 200 using a cable. The implement 200 towed by the multicopter 10 can perform ground operations while being towed during flight or hovering of multicopter 10. The implement 200 during operation may be in the air or on the ground.

In the example shown in FIG. 1C, the multicopter 10 includes power supply 76. The power supply 76 is a device that supplies power to the implement 200 from driving energy sources such as a battery 52 or an electric generator 8 included in the multicopter 10. Various functions of the implement 200 may be performed using this power. The implement 200 includes actuators such as motors that operate using power obtained from the power supply 76 of the multicopter 10. The implement 200 preferably includes a battery for storing power.

Figure 2A:
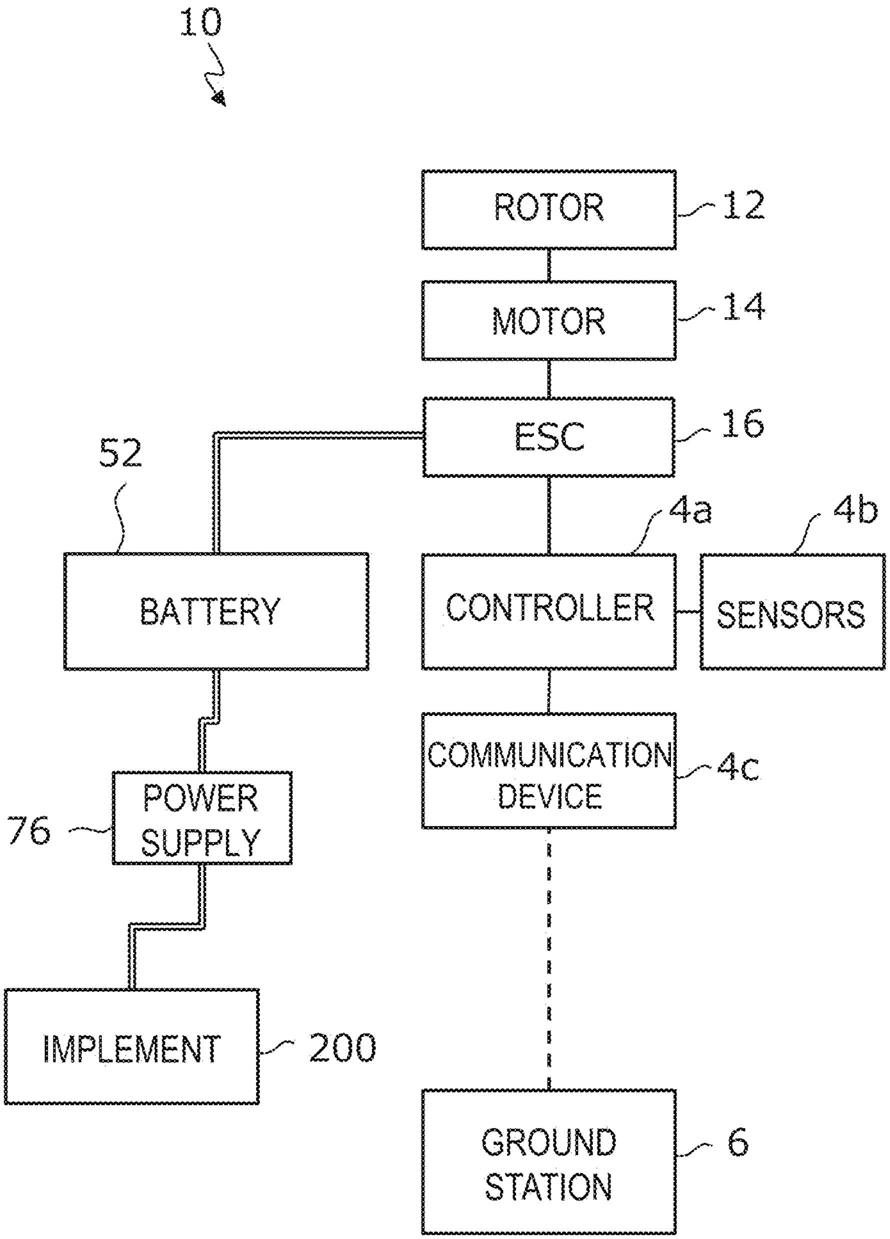
FIG. 2A is a block diagram showing a basic configuration example of a battery-driven multicopter.

FIG. 2A shows a block diagram of a basic configuration example of a battery-driven multicopter 10. The battery-driven multicopter 10 includes a plurality of rotors 12, a plurality of motors 14, each driving a respective one of the plurality of rotors 12, a plurality of ESCs (Electric Speed Controllers) 16 each including a motor drive circuit that drives a respective one of the plurality of motors 14, a battery 52 that supplies power to each of the plurality of motors 14 through each respective ESC 16, a controller 4*a* configured or programmed to control a plurality of ESCs 16 to control attitude while flying, sensors 4*b*, a communication device 4*c*, and a power supply 76 that is electrically connected to the battery 52. In FIG. 2A, for simplicity, the rotor 12, the motor 14, and the ESC 16 are each shown by a single block, but the numbers of rotors 12, motors 14, and ESCs 16 are each plural. This also applies to FIGS. 2B and 2C. The ESC 16 may be included in the controller 4*a*.

The controller 4*a* may receive control commands wirelessly from, for example, a ground station 6 on the ground through the communication device 4*c*. The number of ground stations 6 is not limited to one, and the grand station 6 may be distributed across a plurality of locations. The communication device 4*c* may also wirelessly receive control commands from an operator's controller on the ground. The controller 4*a* may have functions to automatically or autonomously execute takeoff, flight, obstacle avoidance, and landing operations based on sensor data obtained from the sensors 4*b*. The controller 4*a* may be configured or programmed to communicate with the implement 200 connected to the power supply 76 and obtain signals indicating the state of the implement 200. Additionally, the controller 4*a* may provide signals to control the operation of the implement 200. Furthermore, the implement 200 may generate signals to instruct the operation of multicopter 10 and transmit them to the controller 4*a*. Such communication between the controller 4*a* and the implement 200 may be conducted through wired or wireless methods or devices.

Figure 2B:
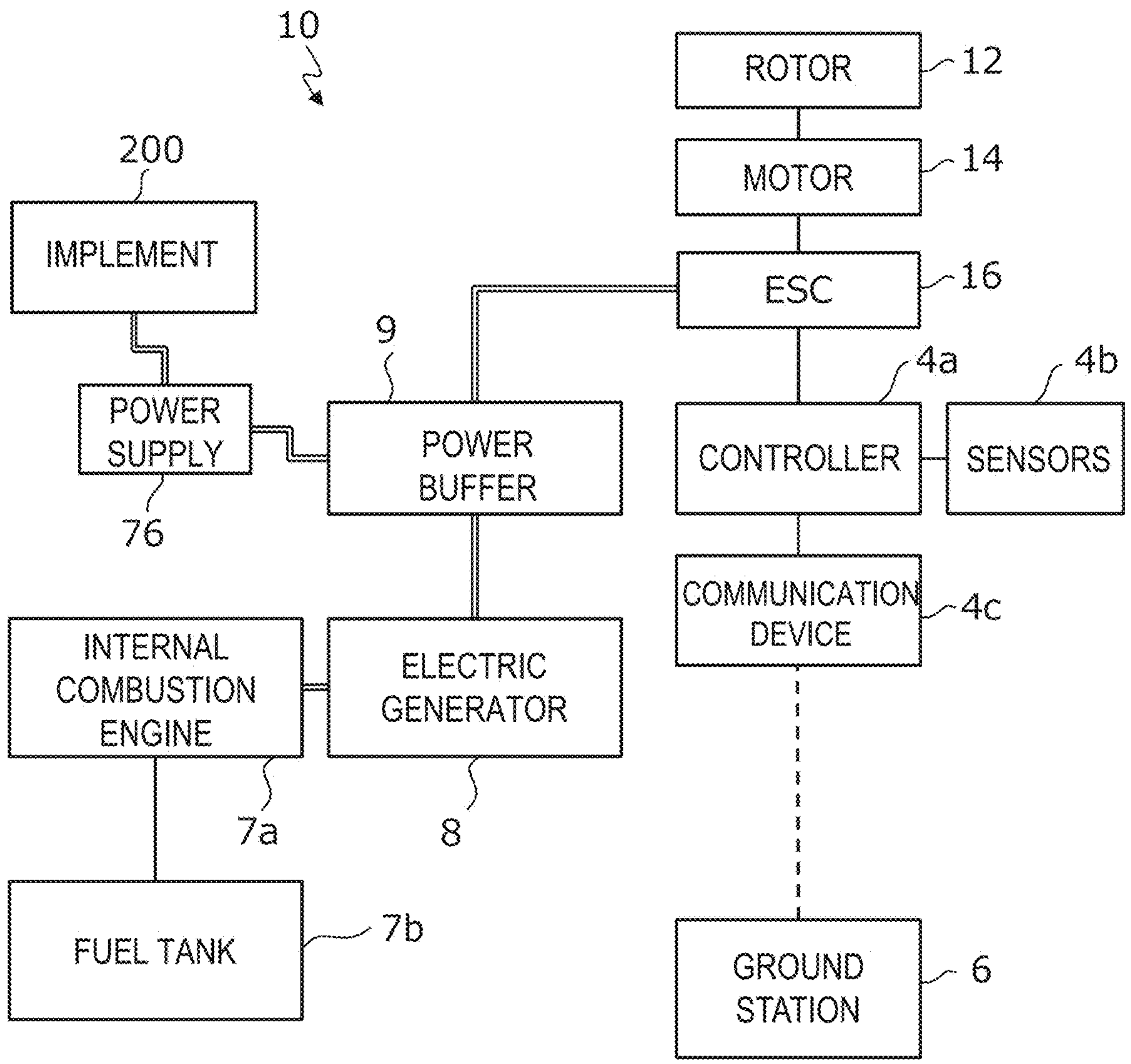
FIG. 2B is a block diagram showing a basic configuration example of a series hybrid type multicopter.

FIG. 2B is a block diagram showing a basic configuration example of a series hybrid drive type multicopter 10. Like the battery-driven multicopter 10, the series hybrid drive type multicopter 10 includes a plurality of rotors 12, a plurality of motors 14, a plurality of ESCs 16, a controller 4*a*, sensors 4*b*, and a communication device 4*c*. The series hybrid drive type multicopter 10 shown in the figure further includes an internal combustion engine 7*a*, a fuel tank 7*b* that stores fuel for the internal combustion engine 7*a*, an electric generator 8 that is driven by the internal combustion engine 7*a* to generate electric power, a power buffer 9 that temporarily stores electric power generated by the electric generator 8, and a power supply 76 that is electrically connected to the power buffer 9. The power buffer 9 is, for example, a battery such as a secondary battery. Electric power generated by the electric generator 8 is supplied to the motors 14 through the power buffer 9 and the ESCs 16. Additionally, the electric power generated by the electric generator 8 may be supplied to the implement 200 through the power supply 76.

Figure 2C:
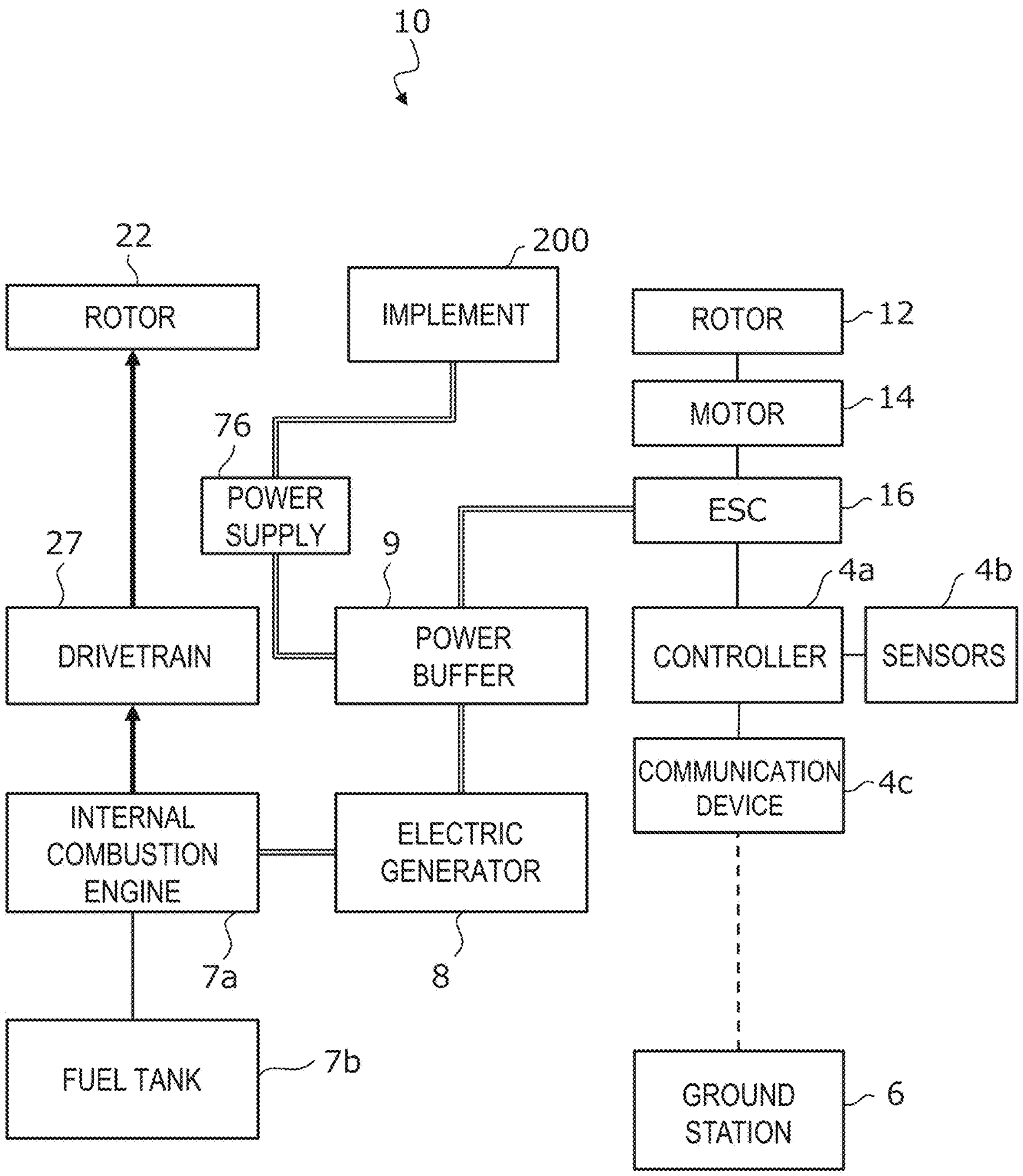
FIG. 2C is a block diagram showing a basic configuration example of a parallel hybrid type multicopter.

FIG. 2C is a block diagram showing a basic configuration example of a parallel hybrid drive type multicopter 10. Like the series hybrid drive type multicopter 10, the parallel hybrid drive type multicopter 10 includes a plurality of rotors 12, a plurality of motors 14, each driving a respective one of the plurality of rotors 12, a plurality of ESCs 16, a controller 4*a*, sensors 4*b*, a communication device 4*c*, an internal combustion engine 7*a*, a fuel tank 7*b*, an electric generator 8, a power buffer 9, and a power supply 76. The parallel hybrid drive type multicopter 10 further includes a drivetrain 27 that transmits driving force from the internal combustion engine 7*a*, and the rotor 22 that rotates upon the receiving driving force from the internal combustion engine 7*a* through the drivetrain 27. The rotor 12 and rotor 22 may be distinguished by calling one "first rotor" and the other "second rotor". The number of rotors 22 connected to drivetrain 27 and rotated may be one or two or more.

In the parallel hybrid drive type multicopter 10, the internal combustion engine 7*a* not only drives the electric generator 8 to generate power, but also mechanically transmits energy to the rotor 22 to rotate the rotor 22. In contrast, in the series hybrid drive type multicopter 10, all rotors 12 are rotated by electric power generated by the electric generator 8. Therefore, in the series hybrid drive type multicopter 10, when the electric generator 8 is, for example, a fuel cell, the internal combustion engine 7*a* is not an essential component.

The following describes configuration examples and operation examples of unmanned aircraft according to example embodiments of the present disclosure, taking a parallel hybrid drive multicopter as an example.

Figure 3A:
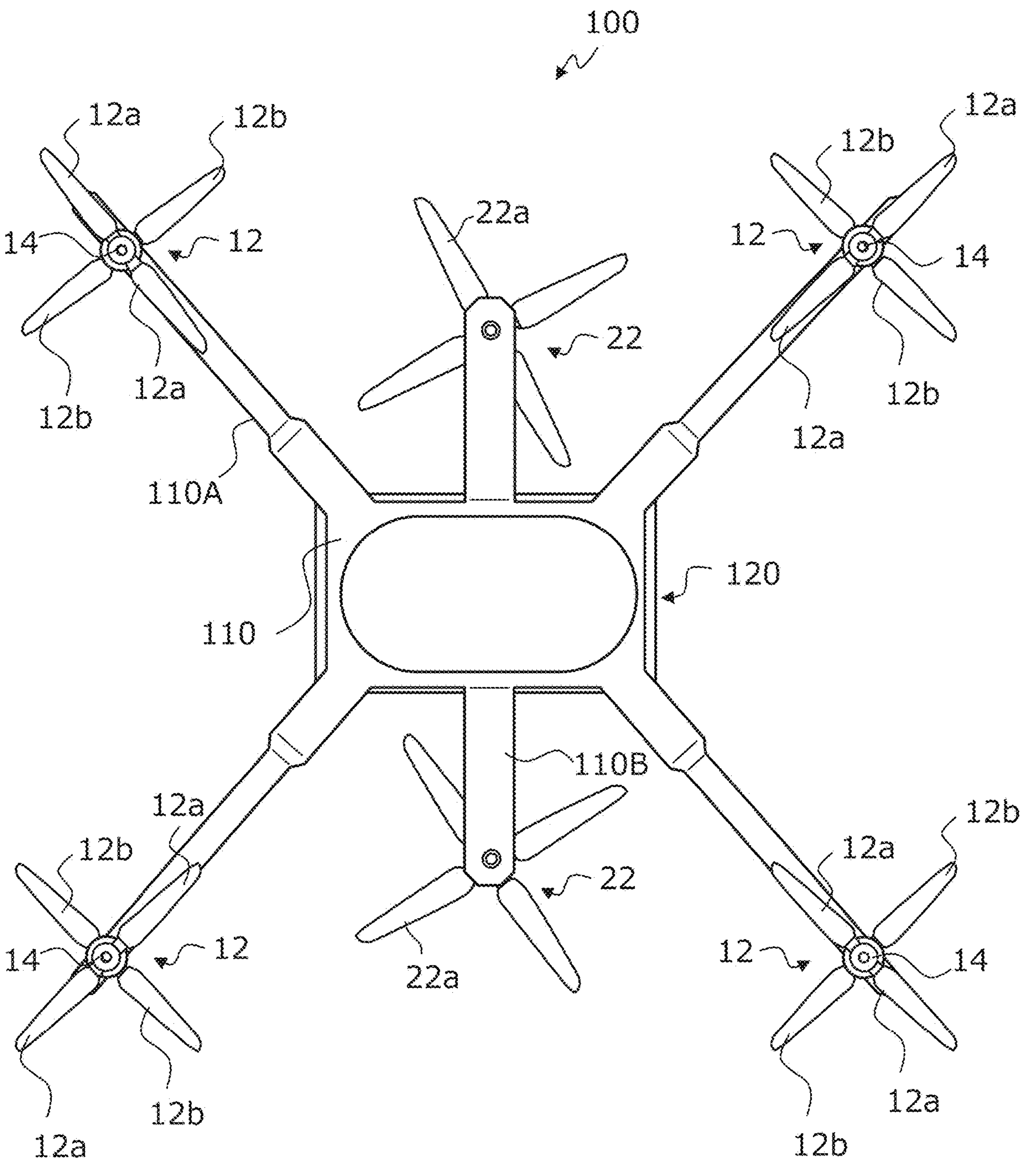
FIG. 3A is a top view schematically showing a multicopter according to an example embodiment of the present invention.
Figure 3B:
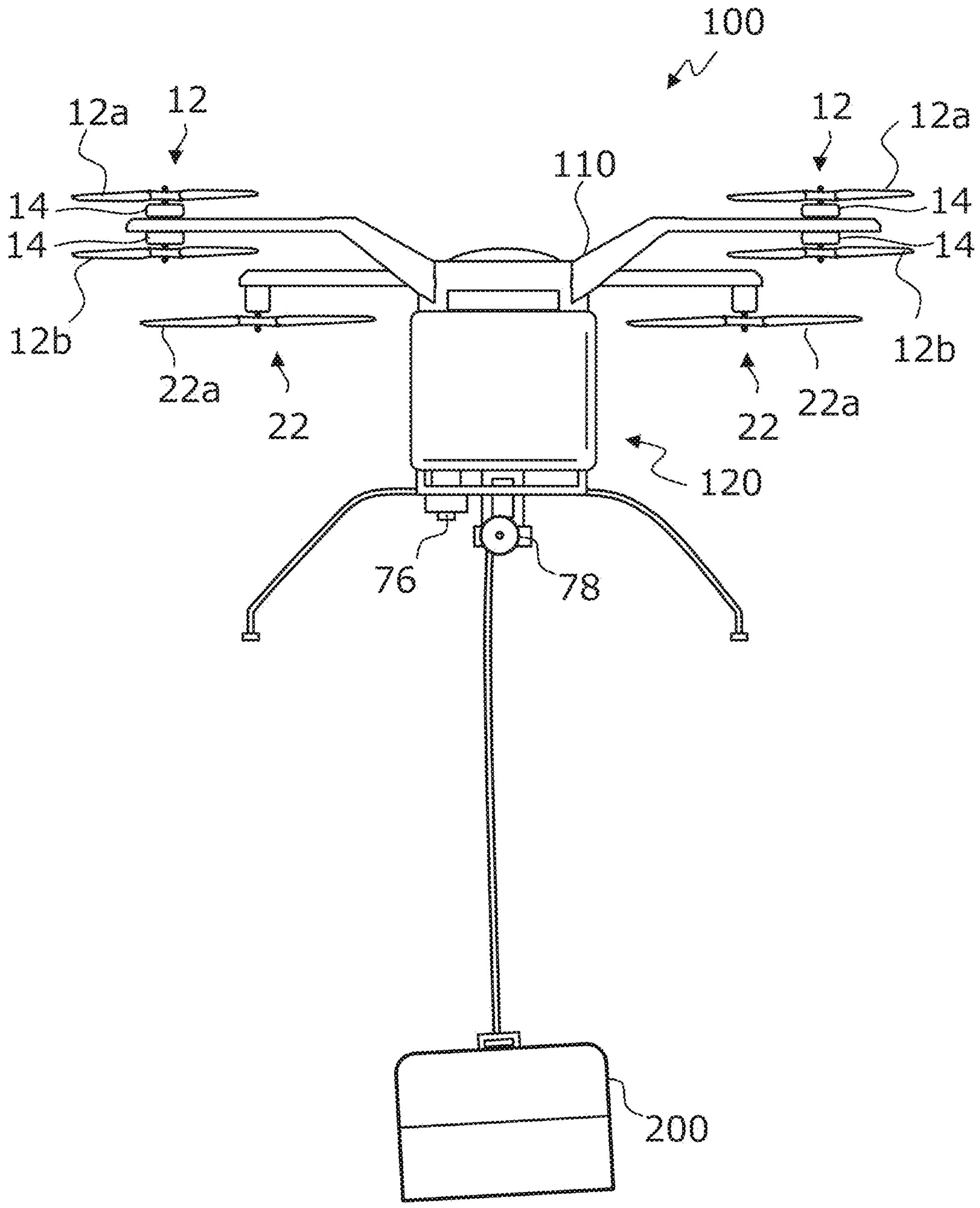
FIG. 3B is a side view schematically showing a multicopter according to an example embodiment of the present invention.

FIG. 3A is a top view schematically showing a multicopter 100 according to the present example embodiment, and FIG. 3B is a side view thereof. In FIG. 3B, an implement 200 connected to the multicopter 100 is shown. The multicopter 100 may be connected with cargo, agricultural materials, other machinery, or containers, cases, or packages capable of accommodating them, together with or in place of the implement 200. Hereinafter, the weight of the implement 200 and the implement itself may be referred to as "payload". The "connection" between the multicopter 100 and the implement 200 or the like may be made by various instruments or devices.

The multicopter 100 shown in FIG. 3A includes eight sub-rotors 12 and two main rotors 22, for example. The sub-rotors 12 include four sets of propellers 12*a* and 12*b* that rotate in opposite directions on the same axis, for example. Each of propellers 12*a* and 12*b* includes two blades, for example. The propellers 12*a*, 12*b* are each rotated by motors 14. The four sets of propellers 12*a* and 12*b* rotating in opposite directions on the same axis are located at vertices of a quadrilateral. The main rotors 22 include two propellers 22*a* rotating in opposite directions at different positions. Each propeller 22*a* includes four blades. The eight propellers 12*a*, 12*b* of sub-rotor 12 have the same pitch angle and diameter. The two propellers 22*a* of main rotor 22 also have the same pitch angle and diameter. The diameter of propeller 22*a* is about 1.2 times or more, for example, about 1.4 times or more and about 2.0 times or less, than the diameter of propellers 12*a*, 12*b*, for example.

The multicopter 100 includes a body frame 110 including four arms 110A for the sub-rotors 12 and two arms 110B for the main rotors 22, for example. The body frame 110 supports a main body 120 including various electronic components and mechanical components described later. The main body 120 and body frame 110 may be collectively referred to as "body 121".

In the example of FIG. 3B, the main body 120 includes a power supply 76 and an actuator 78 used to connect to the implement 200 and other purposes. The power supply 76 is a device that supplies power generated within the main body 120 to the implement 200. The actuator 78 is a device such as an electric motor that performs operations to connect the implement 200 to the main body 120 of the multicopter 100.

In the example of FIG. 3B, the actuator 78 drives a mechanism for winding up a cable connecting the main body 120 and the implement 200. This cable may include a power line for supplying power to the implement 200 from the multicopter 100, and a communication line for communication between the multicopter 100 and the implement 200.

Figure 4:
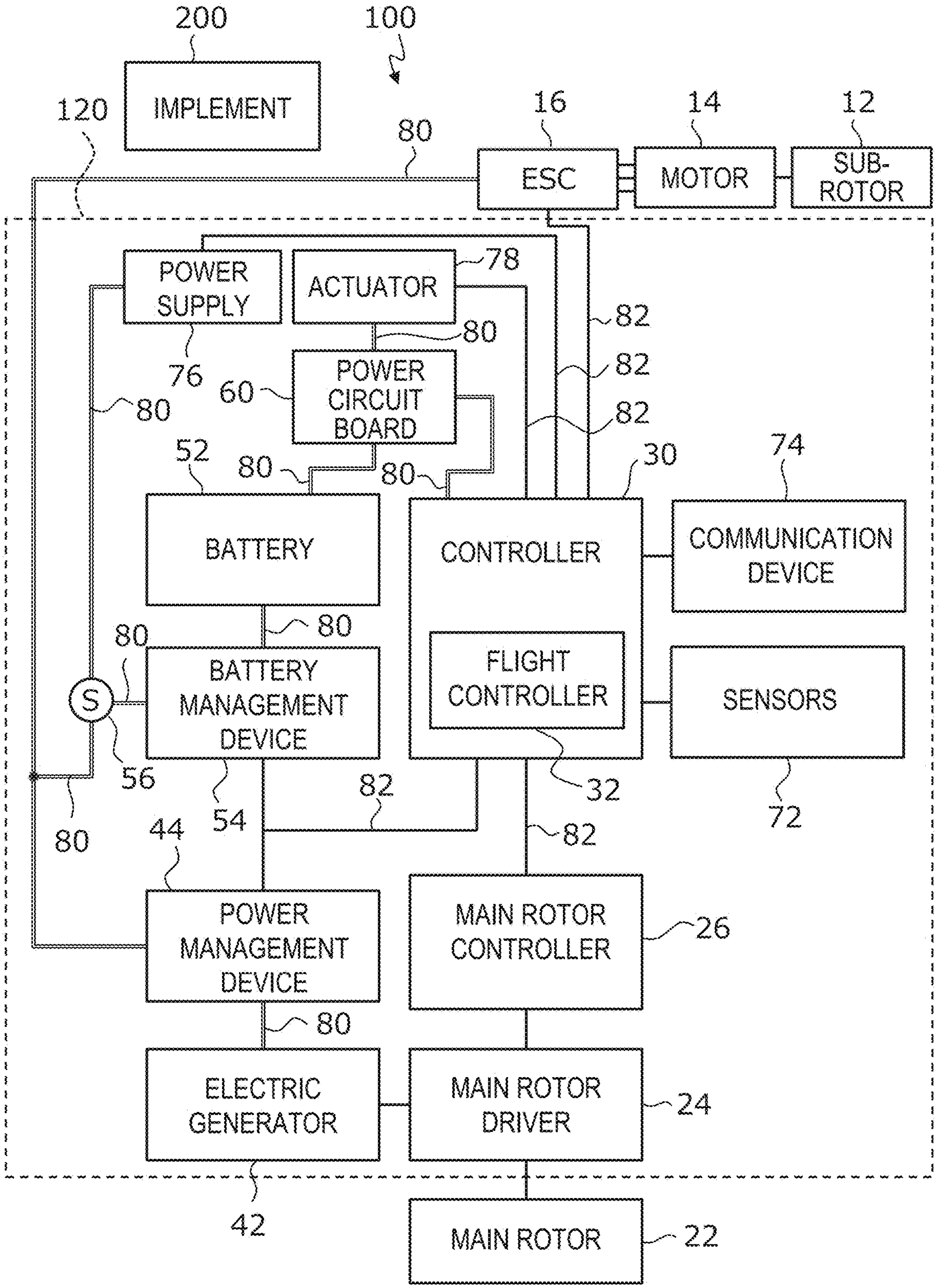
FIG. 4 is a block diagram showing an example of system configuration in a multicopter according to an example embodiment of the present invention.

FIG. 4 is a block diagram showing an example of the system configuration of the multicopter 100 according to the present example embodiment.

In the illustrated example, the main body 120 of the multicopter 100 includes a controller 30 configured or programmed to a flight controller 32, sensors 72, and a communication device 74. These are basically similar to the controller 4*a*, sensors 4*b*, and communication device 4*c* included in the main body 4 of the multicopter 10 explained with reference to FIG. 1A.

The multicopter 100 according to the present example embodiment includes eight sub-rotors 12, eight motors 14 that respectively rotate the eight sub-rotors 12, and eight ESCs that respectively control the eight motors 14, for example. Each ESC 16 receives a motor control signal to control the motor 14 from the controller 30 via wiring 82. The motor control signal is, for example, a Pulse Width Modulation (PWM) signal. When the motor control signal is a PWM signal, the duty cycle of the PWM signal may indicate an analog value of the motor rotation speed. Each ESC 16 controls the rotation speed of the motor 14 connected to that ESC 16 based on the motor control signal from the controller 30. In FIG. 4, for simplicity, one set of "sub-rotor 12, motor 14 and ESC 16" is shown, but the multicopter 100 according to the present example embodiment includes eight sets of "sub-rotor 12, motor 14 and ESC 16". The number of these sets is not limited to eight.

The controller 30 is connected to individual ESCs 16 via electrically independent wiring 82 and may individually control each of the eight ESCs 16. As mentioned earlier, the sub-rotor 12 is used not only to generate lift but also for attitude control. Attitude control is achieved by the flight controller 32 of the controller 30 obtaining measured or estimated values indicating the attitude of the main body 120 from the sensors 72 to determine the current attitude of the main body 120, and controlling the rotation speed of individual motors 14 according to the difference from the target attitude.

The main body 120 includes a main rotor driver 24 that drives the main rotor 22 and a main rotor controller 26 that controls the main rotor drive component 24. In this example embodiment, the main rotor drive component 24 is an internal combustion engine. Therefore, the main rotor controller 26 includes an Engine Control Unit (ECU). The main rotor controller 26 is configured or programmed to execute control of the internal combustion engine by acquiring sensor data such as throttle opening, intake temperature, engine speed, and temperature of various portions of the main rotor drive component 24, which is an internal combustion engine. The main rotor controller 26 is connected to the controller 30 via wiring 82 such as a CAN (Controller Area Network) bus. The main rotor controller 26 is configured or programmed to output engine control signals based on signals transmitted from the controller 30. The engine control signal includes, for example, throttle opening. A digital-to-analog converter (DAC) and/or voltage converter may be connected between the controller 30 and the main rotor controller 26. Mechanical devices such as a clutch and reduction gear may be provided between the main rotor driver 24 and the main rotor 22.

The main rotor driver 24 preferably is an internal combustion engine with minimal vibration. In this example embodiment, the main rotor driver 24 is, for example, an opposed piston engine. The opposed piston engine is disclosed in, for example, Japanese Patent No. 5508604. The entire contents of Japanese Patent No. 5508604 are hereby incorporated by reference.

The main rotor driver 24, which is an internal combustion engine, may drive an electric generator 42 such as an alternator to generate power. In this example embodiment, the electric generator 42 has the structure of an AC synchronous motor including a rotor and a stator. Therefore, the electric generator 42 may also function as a "starter" by rotating the rotor through energization during startup of the main rotor driver 24. The electric generator 42 rectifies the alternating current generated by power generation to convert it to direct current. The electric generator 42 generates direct current power required to drive the motor 14 and supplies it to each ESC 16 via wiring 80. The electric generator 42 is configured to output, for example, a direct current voltage of 250V or higher. Note that the wiring 80 is power wiring, and the wiring 82 is signal wiring. Each of wirings 80 and 82 includes a plurality of conductors.

The electric generator 42 is connected to a power management device 44. The power management device 44 is connected to the controller 30 and a battery management device 54 to be described later. The power management device 44 may control the amount of power generation by the electric generator 42 based on signals from the controller 30 or the battery management device 54. This amount of power generation may be variably controlled by the power management device 44 according to the power required by the motor 14 and battery 52, even when the engine speed of the main rotor driver 24, which is an internal combustion engine, is in a constant state.

The main body 120 further includes a battery 52 including a plurality of cells of, for example, lithium-ion secondary batteries connected in series or parallel, and a battery management device 54 that controls charging and discharging of the battery 52.

The battery 52 may receive direct current power from the electric generator 42 via a power switch 56 and be charged by that power. The operation of the power switch 56 may be controlled by the battery management device 54 and the controller 30. The battery management device 54 is a device that measures or estimates parameter values defining the state of battery 52, such as current flowing through battery 52, cell voltage, cell balance, State Of Charge (SOC), State Of Health (SOH), and temperature.

The battery management device 54 may control the power switch 56 according to the state of the battery 52. For example, when the battery 52 is in a state requiring charging, the battery management device 54 electrically connects the electric generator 42 and battery 52 via the power switch 56, and supplies power from the electric generator 42 to the battery 52 to execute charging operation. At this time, the battery management device 54 may control the power management device 44 and increase the amount of power generation by the electric generator 42 so that the power supplied to ESC 16 does not fall below a desired level. In contrast, when the battery 52 is in a state not requiring charging, the battery management device 54 disconnects the electrical connection between the electric generator 42 and battery 52 by the power switch 56, thus stopping the charging of the battery 52.

In this example embodiment, the battery 52 has a power storage capacity that allows, even when power generation by the electric generator 42 stops for some reason and lift from the main rotor 22 is lost, continued generation of lift and attitude control by the sub-rotor 12 to fly to a location where landing is possible and land there. In other words, when the multicopter 100 according to this example embodiment is flying normally, the power required to drive the sub-rotor 12 can be supplied to ESC 16 from the electric generator 42 rather than from the battery 52. Therefore, even when increasing payload and flight duration, there is little need to increase the power storage capacity of battery 52 accordingly.

The power stored in battery 52 may be output as, for example, a direct current voltage of 250V or higher. However, this direct current voltage decreases with decreasing state of charge. Therefore, when the state of charge falls below a predetermined level, the battery management device 54 operates to supply a portion of the direct current power from the electric generator 42 to battery 52 to charge battery 52.

The battery 52 is connected to a power circuit board 60. The power circuit board 60 has the function of stepping down the voltage output from battery 52 to, for example, 24V, 12V, and 5V. The direct current voltage output from battery 52 is converted to a desired voltage by the power circuit board 60 before being supplied to other electronic components. In the example of FIG. 4, power stepped down by the power circuit board 60 is supplied to the controller 30 and actuator 78 via wiring 80.

In the example of FIG. 4, the power supply 76 is electrically connected to the electric generator 42 or battery 52 via the power switch 56. The power supply 76 in this example is configured to supply power generated within the main body 120 to external machines and devices such as the implement 200.

The main body 120 may have configurations not shown in FIG. 4. For example, the main body 120 may include a fuel tank for storing fuel required for operation of the main rotor driver 24, water-cooled or air-cooled devices for cooling the main rotor driver 24, and electrical equipment such as lighting devices and electric pumps. The electrical equipment may operate on power stepped down to a predetermined voltage by the power circuit board 60. Additionally, a battery (auxiliary battery) for electrical equipment may be provided and configured to supply power to the electrical equipment. Such an auxiliary battery may be charged from the battery 52 or the electric generator 42.

In this example embodiment, the motor 14 functions as a plurality of "attitude controllers" that respectively drive a plurality of first rotors (sub-rotors) 12. Additionally, the main rotor driver 24, which is an internal combustion engine, functions as a "main thrust generating device" that drives the second rotor (main rotor) 22.

In the example shown in FIG. 4, while the controller 30 and the main rotor controller 26 are separate components, a single controller (computer or ECU) may be configured or programmed to perform the functions of both the controller 30 and the main rotor controller 26.

In this example embodiment, the controller 30 may vary the ratio (thrust ratio) between a first thrust generated by the sub-rotors (first rotors) obtained from the plurality of motors 14, and a second thrust generated by the main rotors (second rotors) obtained from the main rotor driver 24. This point will be explained in detail below.

Generally, the responsiveness of motor 14 is superior to that of internal combustion engines. Regarding the torque required for rotation of rotors 12, 22, when the time from the input of a torque command signal to the achievement of the torque target value is called the "response time," the response time of motors is, for example, about 1/100 of that of internal combustion engines. Therefore, to control the attitude of the multicopter 100, it is desirable to detect the difference between the current value and target value of the attitude angle of the multicopter 100, and control the rotation speed of each of the plurality of sub-rotors 12 with high response speed to reduce this difference. An increase in rotor rotation speed generates an increase in thrust. By adjusting the thrust of each of the plurality of sub-rotors 12, it is possible to control the attitude of the multicopter 100 with high precision and quickly.

In contrast, internal combustion engines efficiently generate large thrust. While the rotation of sub-rotor 12 is performed using power generated by the power of the main rotor driver 24, which is an internal combustion engine, energy loss occurs when converting mechanical energy to electrical energy. Therefore, from the viewpoint of improving energy consumption efficiency, it is preferable that the main rotor driver 24 be used for main thrust generation by rotating the main rotor 22. Additionally, to increase the thrust of main rotor 22, it is preferable that the diameter of main rotor 22 be larger than the diameter of each of the plurality of sub-rotors 12.

However, when the main rotor 22 for main thrust generation is generating large thrust, that large thrust and rotational moment may, conversely, inhibit the attitude control function of the sub-rotors 12. As a result, even when using the plurality of motors 14 with superior responsiveness to rotate the plurality of sub-rotors 12, delays in attitude control response may occur. In contrast, while lowering the rotation speed of the main rotor 22 improves attitude control performance, energy consumption efficiency decreases.

In battery-powered multicopters, various algorithms are used to adjust the torque of each of the plurality of motors to balance the thrust of each rotor and control to a desired attitude. When performing attitude control with the plurality of motors in such case, adding a rotor rotated by an internal combustion engine may complicate the calculations needed for attitude control. To avoid such complications, it is effective to fix the "ratio" between the thrust obtained from the plurality of motors and the thrust obtained from the internal combustion engine. Therefore, in conventional parallel hybrid types, a control method that fixes this ratio has been adopted.

However, as a result of studies by the present inventors, it was discovered that when using the multicopter 100 for agricultural work, for example, it is preferable to make the above "ratio" variable rather than fixed, compared to when flying the multicopter 100 for simple logistics or surveillance purposes. This is because when flying for agricultural purposes, the multicopter 100 operates under various different conditions, such as various agricultural work (ground work) within fields, movement between a plurality of fields, and transport of agricultural materials or harvested crops, and due to these conditions, the required response speed level for attitude control changes significantly. Additionally, when connecting implements with diverse weights and shapes selected according to the content of agricultural work, the required lift and precision of attitude control may also change significantly.

In this example embodiment, when precise attitude control is not required, for example, when there are few external disturbances such as wind, when the payload is small, or when only moving without performing work using an implement, the thrust of the main rotors 22 can be increased, and instead, the thrust of the sub-rotors 12 can be decreased.

On the other hand, when precise attitude control is required, for example, when performing ground operations while flying with an implement connected, or when it is required to move the main body and change attitude more nimbly than during normal flight, it is preferable to decrease (or eliminate) the thrust of the main rotors 22, and instead, increase the thrust of the sub-rotors 12. Although such reduction of the thrust of the main rotors may cause a decrease in overall energy consumption efficiency, it enables improvement in attitude control performance (response performance).

This section explains an example of control (which may be referred to as "landing control") when the multicopter 100 according to this example embodiment performs a landing operation. The controller 30 of the multicopter 100 according to this example embodiment, when performing a landing operation, generates the difference between the second thrust $T_2$ that is the sum of thrust generated by the main rotor(s) (second rotor(s)) 22, and the first thrust $T_1$ that is the sum of thrust generated by the sub-rotor(s) (first rotor(s)) 12, smaller than that during hovering. The phrase "when performing a landing operation" refers to, for example, the period from receiving a signal instructing landing until landing is completed. According to the multicopter 100 of this example embodiment, it is possible to improve the precision of attitude control during landing operations.

Figure 5A:
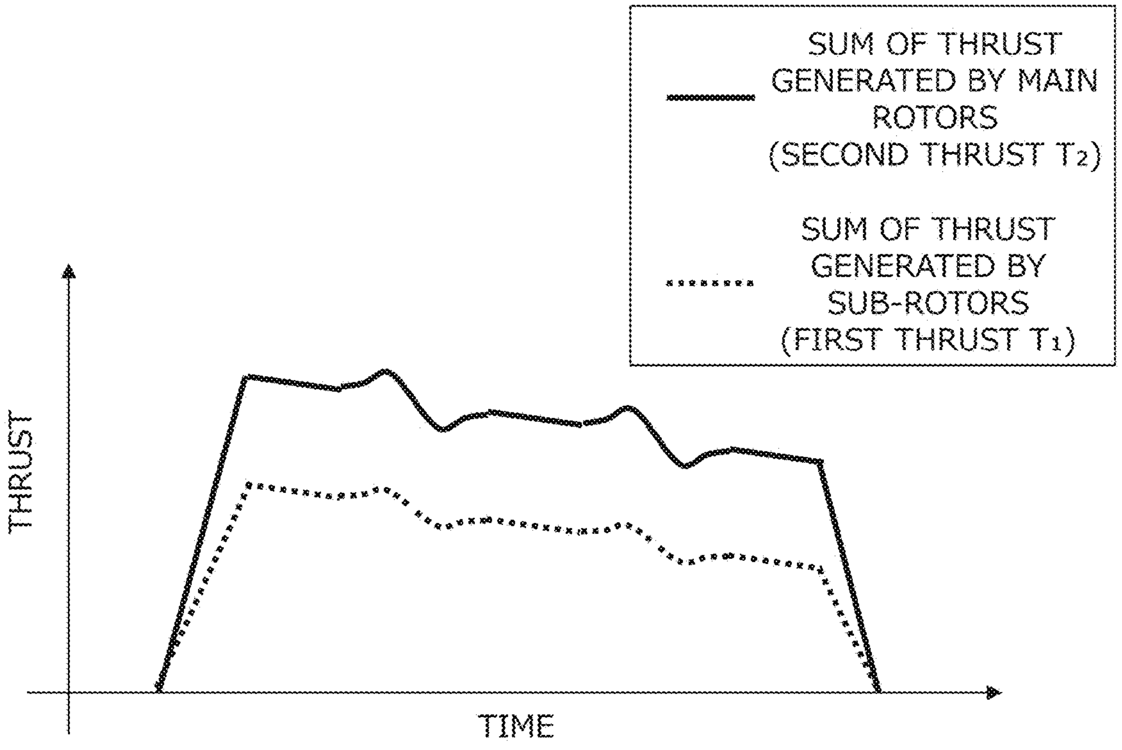
FIG. 5A is a graph showing an example of time variation of the sum of thrust generated by main rotors and the sum of thrust generated by sub-rotors.
Figure 5B:
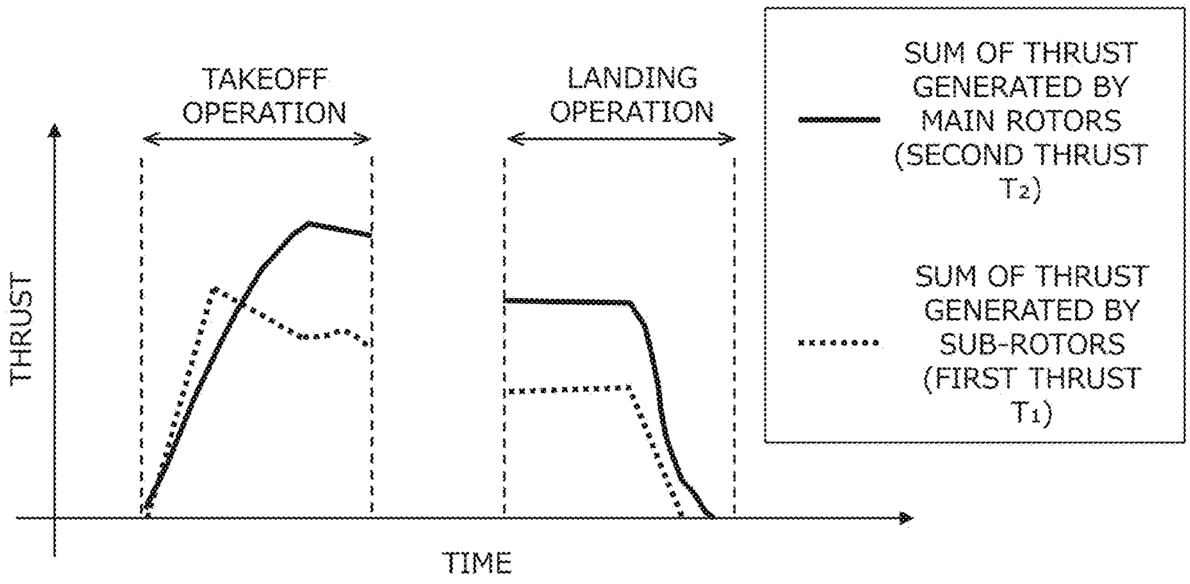
FIG. 5B is a graph showing an example of time variation of the sum of thrust generated by main rotors and the sum of thrust generated by sub-rotors.
Figure 5C:
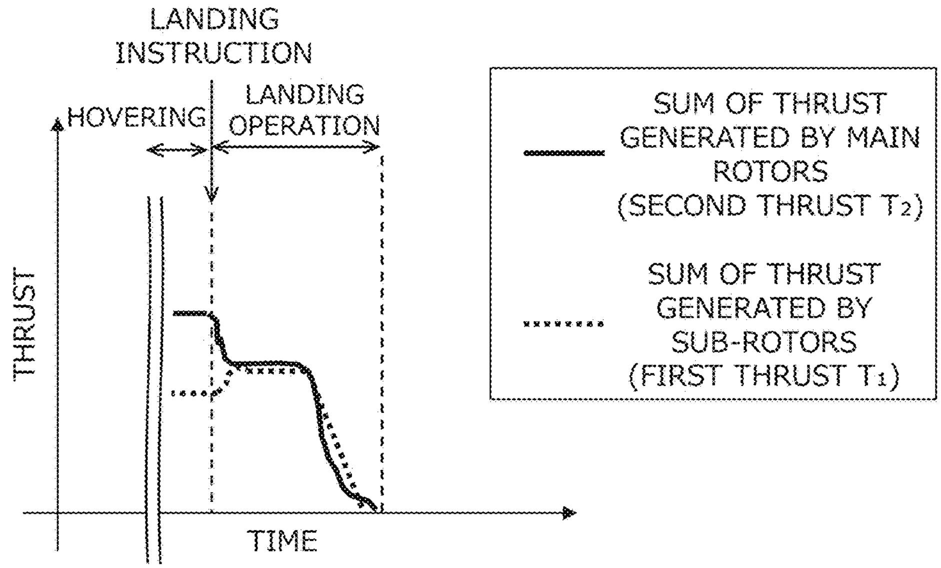
FIG. 5C is a graph showing an example of time variation of the sum of thrust generated by main rotors and the sum of thrust generated by sub-rotors.

FIGS. 5A, 5B, and 5C are graphs showing examples of time variation of the second thrust $T_2$ that is the sum of thrust generated by the main rotors 22, and the first thrust $T_1$ that is the sum of thrust generated by the sub-rotors 12. For example, as shown in the examples of FIGS. 5A and 5B, the ratio between the second thrust $T_2$ and the first thrust $T_1$ may be fixed at a preferred value (for example, $T_2:T_1=6:4$) determined according to the configuration of the multicopter 100 or the flight plan during the flight of the multicopter 100. Fixing the ratio between the second thrust $T_2$ and the first thrust $T_1$ can avoid complication of the control, but on the other hand, the precision of attitude control may not be sufficient in specific flight states or situations. According to studies by the present inventors, for example, when performing a landing operation, if the ratio between the second thrust $T_2$ and the first thrust $T_1$ is fixed at the same value as before the landing operation (for example, during hovering), the multicopter 100 may rotate in the yaw direction.

One reason why the precision of attitude control is not sufficient during landing operations can be the difference in response speed between the main rotors 22 and the sub-rotors 12. When the main rotors 22 and the sub-rotors 12 are driven by different rotation drivers, the response speeds of the main rotors 22 and the sub-rotors 12 may differ from each other. The rotation driver to drive the sub-rotors (first rotors) 12 may be referred to as a "first type of rotation driver," and the rotation driver to drive the main rotors (second rotors) 22 may be referred to as a "second type of rotation driver." The unmanned aerial vehicle according to this example embodiment includes the rotation driver 3D shown in FIG. 1A. That is, the main rotors 22 are driven by an internal combustion engine (second type of rotation driver), and the sub-rotors 12 are driven by motors 14 (first type of rotation driver). Since the responsiveness of motors 14 is generally superior to that of internal combustion engines, the response speed of the main rotors 22 is lower than the response speed of the sub-rotors 12. When the main rotors 22 generate large thrust, that large thrust and rotational moment may, conversely, inhibit the attitude control function of the sub-rotors 12. As a result, even when using the plurality of motors 14 with superior responsiveness to rotate the plurality of sub-rotors 12, delays in attitude control response may occur.

Note that even when having the rotation driver 3A, 3B, or 3C shown in FIG. 1A instead of the rotation driver 3D, by making some motor(s) 14 or power transmission system(s) 23 different from other motor(s) 14 or power transmission system(s) 23, it is possible to realize an unmanned aerial vehicle having first rotors and second rotors driven by different rotation drivers. In such cases, motor(s) 14 or power transmission system(s) 23 with relatively high response speed may constitute the "first type of rotation driver," and motor(s) 14 or power transmission system(s) 23 with relatively low response speed may constitute the "second type of rotation driver." Additionally, an unmanned aerial vehicle may include a plurality of internal combustion engines with different response speeds. In such case, it is possible to realize an unmanned aerial vehicle including first rotors and second rotors driven by different rotation drivers, where an internal combustion engine with relatively high response speed constitutes the "first type of rotation driver," and an internal combustion engine with relatively low response speed constitutes the "second type of rotation driver." The output of an internal combustion engine with relatively high response speed may be, for example, lower than the output of an internal combustion engine with relatively low response speed.

Note that the difference in response speed between the first rotors 12 and the second rotors 22 is not limited to when they are driven by different rotation drivers, but may also occur, for example, when the thrust generated per rotation differs between the first rotors 12 and the second rotors 22, or when the inertial force of the first rotors 12 and the inertial force of the second rotors 22 differ from each other, for example, due to differences in weight between the first rotors 12 and the second rotors 22. This example embodiment can be applied to such cases as well. That is, for example, the controller 30, when performing a landing operation, is configured or programmed to generate the difference between the first thrust, which is the sum of thrust generated by the first rotors, and the second thrust, which is the sum of thrust generated by the second rotors that generate greater thrust per rotation than the first rotors, smaller than that during hovering. Alternatively, the controller 30, when performing a landing operation, is configured or programmed to generate the difference between the first thrust, which is the sum of thrust generated by the first rotors, and the second thrust, which is the sum of thrust generated by the second rotors that have greater inertial force than the first rotors, smaller than that during hovering.

The controller 30 according to this example embodiment is configured or programmed to generate the difference between the second thrust $T_2$ that is the sum of thrust generated by the main rotors 22, and the first thrust $T_1$ that is the sum of thrust generated by the sub-rotors 12, smaller than that during hovering. For example, as shown in the example of FIG. 5C, the controller 30, when performing a landing operation, is configured or programmed to cause the ratio of the first thrust $T_1$ to the second thrust $T_2$ ($T_1/T_2$) to be greater than that during hovering, and then decreases both the first thrust $T_1$ and the second thrust $T_2$. By causing the ratio of the first thrust $T_1$ to the second thrust $T_2$ ($T_1/T_2$) to be greater than that during hovering, it is possible to improve attitude control performance (response performance). Typically, during hovering, the first thrust $T_1$ generated by the sub-rotors 12, which are used for thrust generation and attitude control, is smaller than the second thrust $T_2$ generated by the main rotors 22, which are used for main thrust generation. Therefore, the controller 30, when performing a landing operation, is configured or programmed to cause the ratio of the first thrust $T_1$ to the second thrust $T_2$ ($T_1/T_2$) to be greater than that during hovering by increasing the first thrust $T_1$ and/or decreasing the second thrust $T_2$.

Figure 6:
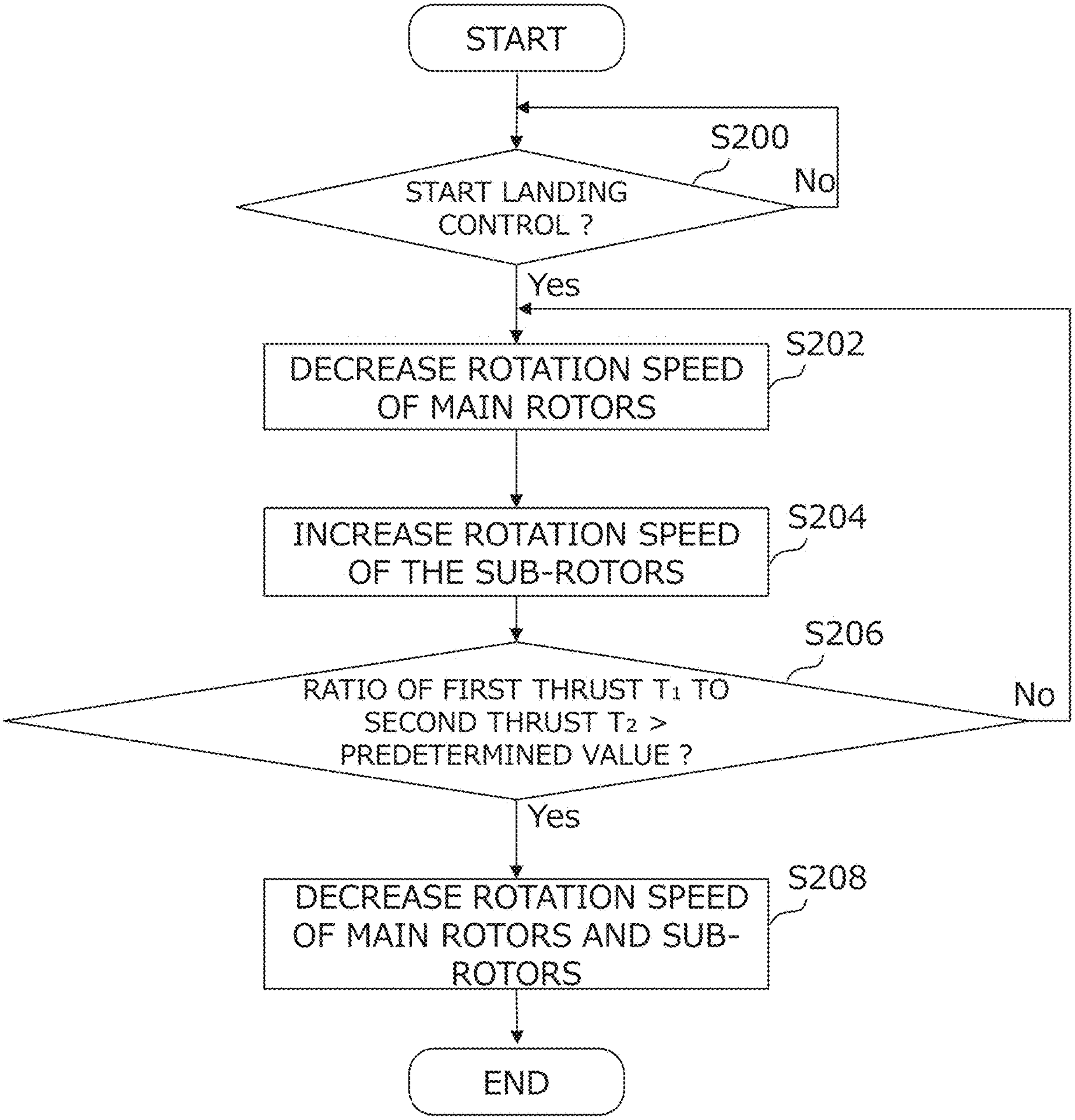
FIG. 6 is a flowchart showing an example of processing performed by a controller.
Figure 7:
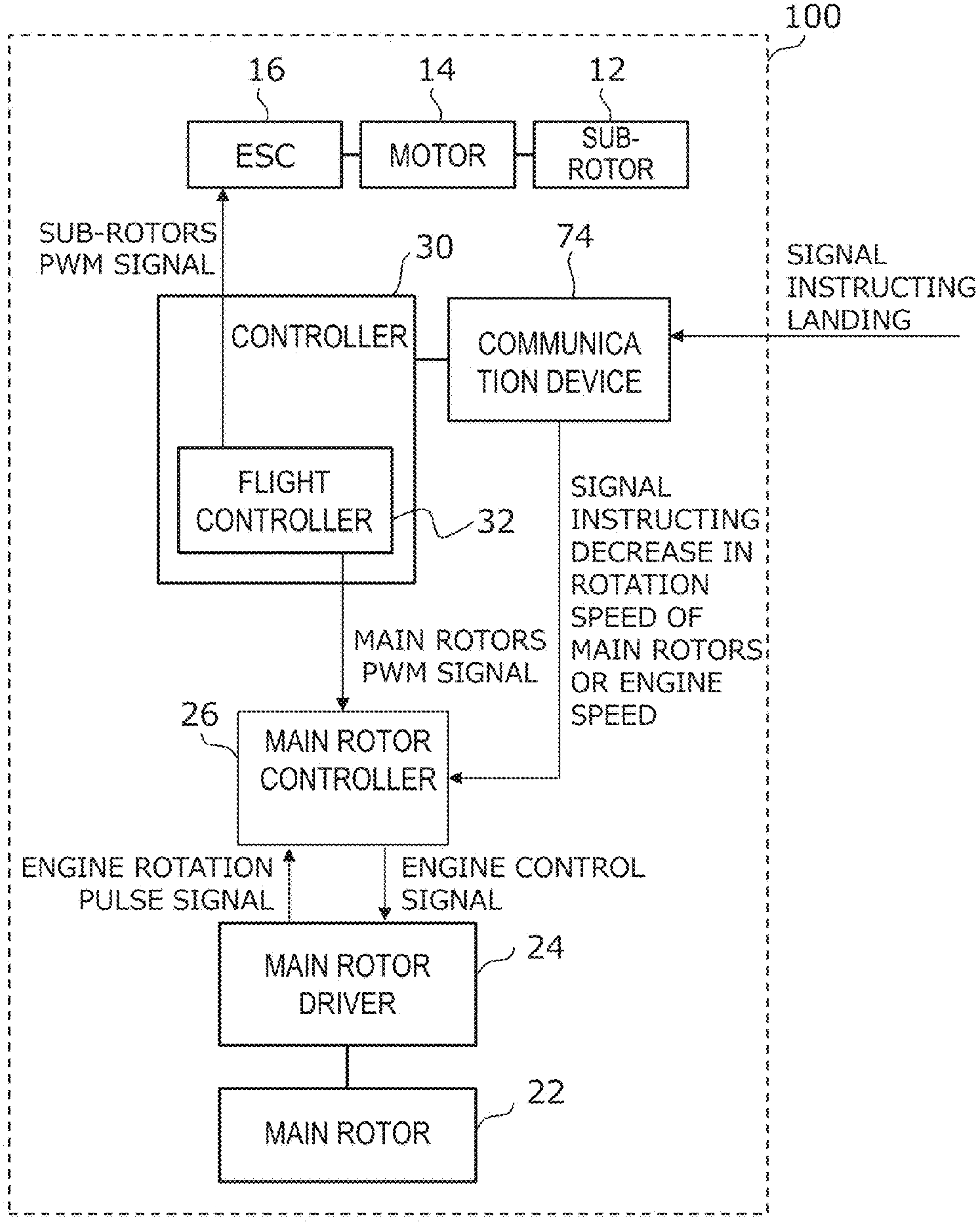
FIG. 7 is a block diagram showing an example of system configuration in a multicopter of an example embodiment of the present invention.

An example of landing control will be explained with reference to FIGS. 6 and 7. FIG. 6 is a flowchart showing an example of processing performed by the controller 30. FIG. 7 is a schematic diagram explaining an example of system configuration for realizing landing control. Structural elements or functions common to the system configuration example shown in FIG. 4 may be omitted from illustration and explanation.

First, in step S200, the controller 30 determines whether to start landing control. The controller 30 determines whether to start landing control based on, for example, a signal instructing landing from an external device such as an operating machine or remote monitoring device used by a user, or a pre-set flight plan. When it is determined to start landing control (in the case of "Yes"), the process proceeds to step S202.

In step S202, the controller 30 decreases the rotation speed of the main rotors 22. The controller 30 decreases the rotation speed of the main rotors 22 by controlling the main rotor driver 24, which is an internal combustion engine (engine). The controller 30 is configured or programmed to control the main rotor driver 24, which is the internal combustion engine, via the main rotor controller 26, by sending a control signal (for example, a PWM signal for the main rotors 22) from the flight controller 32 to the main rotor controller 26. When the communication device 74 receives a signal instructing landing, the controller 30 causes the communication device 74 to send a signal to decrease the rotation speed of the main rotors 22 (or a signal to decrease the engine speed) to the main rotor controller 26. The main rotor controller 26 outputs an engine control signal to the main rotor driver 24 based on the PWM signal for the main rotors 22 and the signal from the communication device 74.

After step S202, in step S204, the controller 30 increases the rotation speed of the sub-rotors 12. Each ESC 16 receives a signal for controlling the motor 14 (for example, a PWM signal for the sub-rotors 12) from the flight controller 32 of the controller 30. Since the responsiveness of motors 14 is generally superior to that of internal combustion engines, it is preferable to decrease the rotation speed of the main rotors 22 in step S202 before increasing the rotation speed of the sub-rotors 12 in step S204.

In step S206, the controller 30 determines whether the ratio of the first thrust $T_1$ to the second thrust $T_2$ ($T_1/T_2$) is greater than a predetermined value. The predetermined value may be set to, for example, the ratio of the first thrust $T_1$ to the second thrust $T_2$ during hovering. Steps S202 and S204 are repeated until it is determined that the ratio of the first thrust $T_1$ to the second thrust $T_2$ ($T_1/T_2$) is greater than the predetermined value. When it is determined that the ratio of the first thrust $T_1$ to the second thrust $T_2$ ($T_1/T_2$) is greater than the predetermined value (in the case of "Yes"), the process proceeds to step S208.

In step S208, the controller 30 decreases the rotation speed of the main rotors 22 and the rotation speed of the sub-rotors 12. At this time, the rotation speeds of the main rotors 22 and the sub-rotors 12 may be decreased while maintaining the ratio of the first thrust $T_1$ to the second thrust $T_2$ ($T_1/T_2$). After this, when the multicopter 100 lands, landing control is completed.

The process shown in FIG. 6 may be repeatedly executed by, for example, the flight controller 32 of the controller 30 during the flight of the multicopter 10.

Note that the control method of this example embodiment is not limited to when performing a landing operation but can be applied to flight states and situations where improvement in attitude control precision (responsiveness) is required. For example, when performing a takeoff operation, when there are external disturbances such as wind, when the wind is strong (wind speed is high), when changing the flight path to avoid obstacles, when connecting or hanging cargo or other loads to the main body, when there is delay or deviation in the responsiveness of attitude control, etc., the precision of attitude control (response performance) can be improved by relatively decreasing the thrust generated by rotors with relatively low response speed and relatively increasing the thrust generated by rotors with relatively high response speed. At this time, the timing of decreasing the thrust generated by rotors with relatively low response speed (for example, decreasing the engine speed) may be prior to the timing of increasing the thrust generated by rotors with relatively high response speed. Additionally, the acceleration/deceleration to decrease the thrust generated by rotors with relatively low response speed may be set higher than the acceleration/deceleration for increasing the thrust generated by rotors with relatively high response speed.

Figure 8:
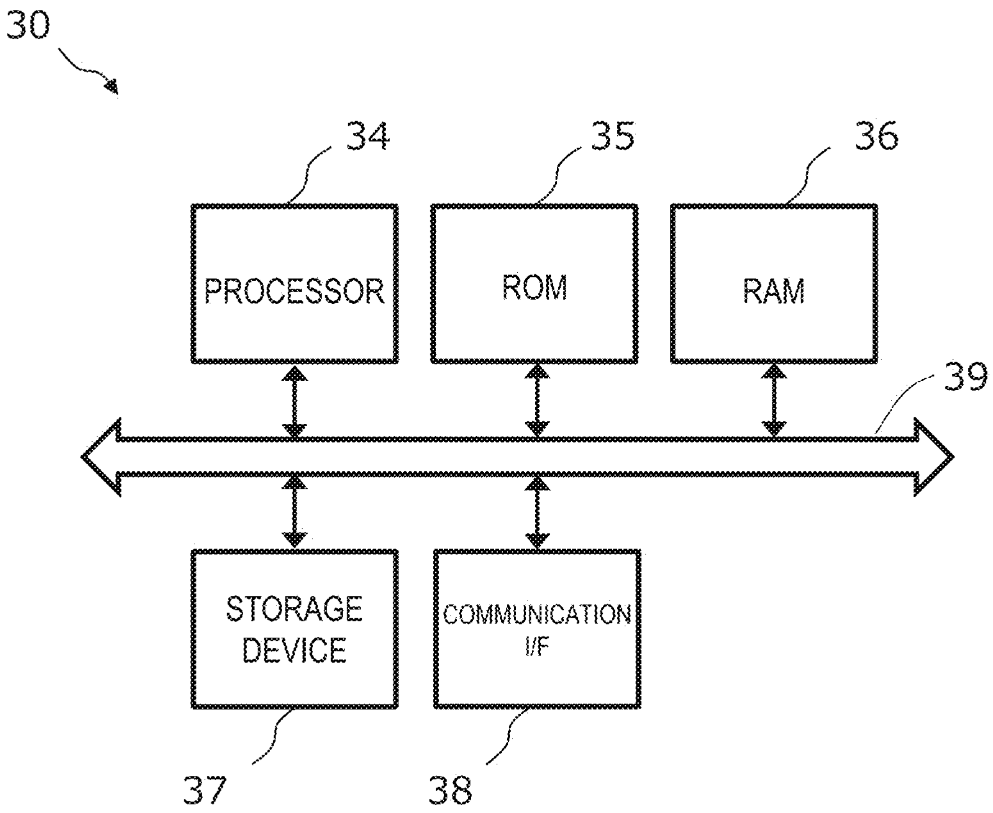
FIG. 8 is a block diagram showing an example of hardware configuration of the controller in the present example embodiment of the present invention.

FIG. 8 is a block diagram showing an example of the hardware configuration of the controller 30. The controller 30 includes a processor 34, ROM (Read Only Memory) 35, RAM (Random Access Memory) 36, storage device 37, and communication I/F 38. These components are interconnected via a bus 39.

The processor 34 is one or more semiconductor integrated circuits, also referred to as a central processing unit (CPU) or microprocessor. The processor 34 sequentially executes computer programs stored in ROM 35 to implement the aforementioned processing. The term processor 34 is broadly interpreted to encompass devices such as FPGA (Field Programmable Gate Array) with CPU, GPU (Graphic Processor Unit), ASIC (Application Specific Integrated Circuit), or ASSP (Application Specific Standard Product).

The ROM 35 is, for example, a writable memory (for example, PROM), rewritable memory (for example, flash memory), or read-only memory. The ROM 35 stores programs that control the operation of the processor. The ROM 35 need not be a single recording medium but may be a collection of a plurality of recording media. A portion of the plurality of collections may be removable memory.

The RAM 36 provides a work area for temporarily expanding programs stored in the ROM 35 during boot-up. The RAM 36 need not be a single recording medium but may be a collection of a plurality of recording media.

The communication I/F 38 is an interface for communication between the controller 30 and other electronic components or electronic controllers (ECUs). For example, the communication I/F 38 may perform wired communication complying with various protocols. The communication I/F 38 may perform wireless communication complying with Bluetooth® standards and/or Wi-Fi® standards. Both standards include wireless communication standards utilizing the 2.4 GHz frequency band.

The storage device 37 may be, for example, a semiconductor memory, magnetic storage device, or optical storage device, or a combination thereof. The storage device 37 is configured to store, for example, map data useful for autonomous flight of the multicopter 10, and various sensor data acquired by the multicopter 10 during flight.

Note that, as mentioned earlier, the controller 30 may be configured or programmed to include, as separate components, a flight controller such as the flight controller 32 and an upper-level computer (companion computer). Also, a system including the controller 30 and the main rotor controller 26 may be used as a "controller".

Figure 9:
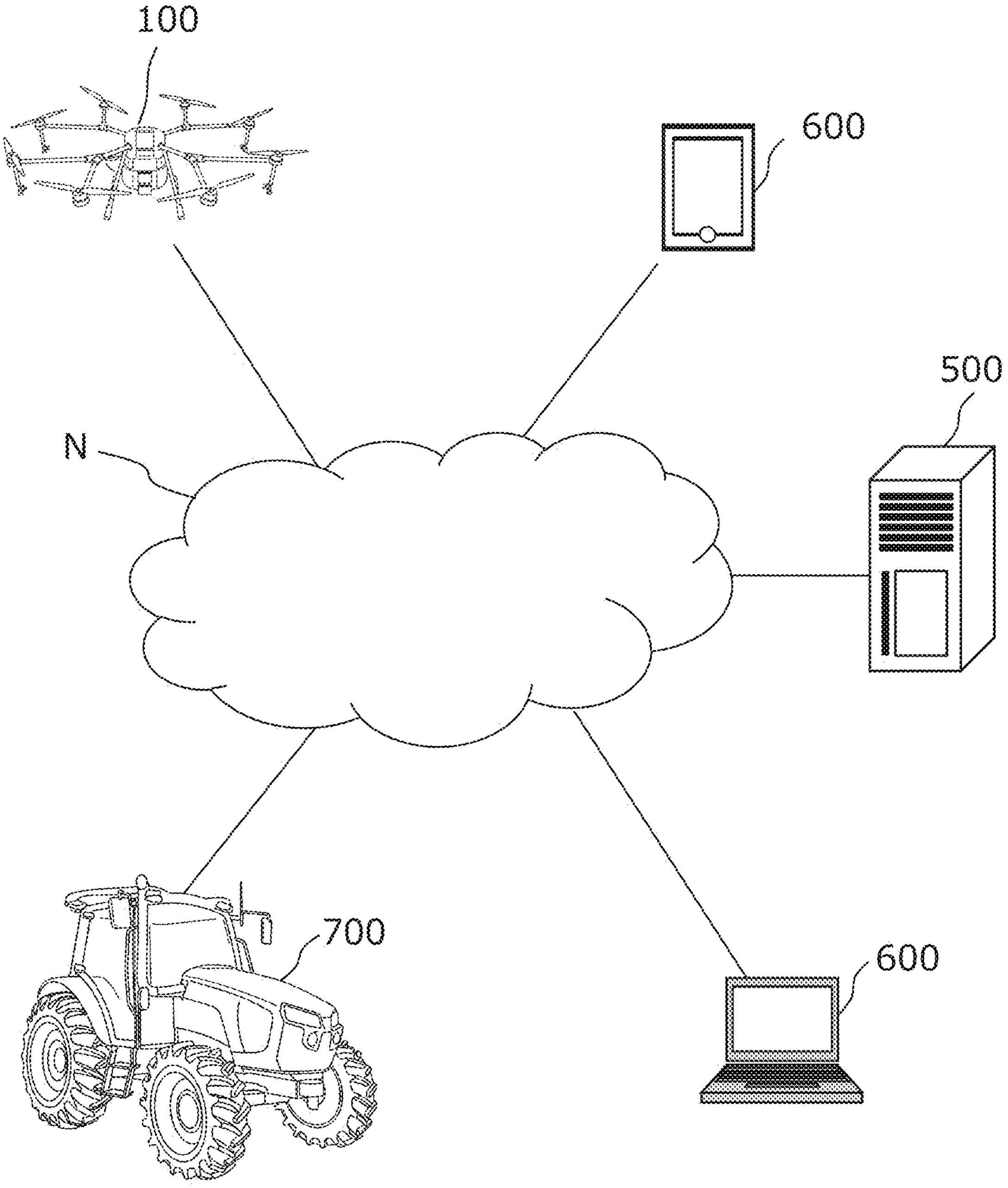
FIG. 9 is a diagram schematically showing an example of a communication network to which the multicopter in the present example embodiment of the present invention is connected.

Additionally, one or more servers (computers) 500 or terminal devices (including portable and fixed types) 400 connected to the communication device 74 of the multicopter 100 via a communication network N, as shown in FIG. 9, may execute some or all of the functions of the controller 30. The agricultural machine 700 such as tractors may be connected to this communication network N, and communication may be performed between the multicopter 100 and the agricultural machine 700. Through the communication network N, a portion of the data used for processing by the controller 30 and control signals for the multicopter 100 may be provided to the multicopter 100 from the agricultural machine 700.

Unmanned aerial vehicles according to example embodiments of the present disclosure may be widely utilized not only for aerial photography, surveying, logistics, and agricultural chemical spraying applications but also for ground work related to agriculture, transportation of harvested crops and agricultural materials.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An unmanned aerial vehicle comprising:

a plurality of rotors;

a first type of rotation driver to drive one or more first rotors included in the plurality of rotors;

a second type of rotation driver to drive one or more second rotors included in the plurality of rotors; and a controller configured or programmed to control rotation of the plurality of rotors by controlling the first type of rotation driver and the second type of rotation driver; wherein the controller is configured or programmed to control the first type of rotation driver and the second type of rotation driver, when performing a landing operation, to generate a difference between a first thrust that is a sum of thrust generated by the one or more first rotors and a second thrust that is a sum of thrust generated by the one or more second rotors that is less than a difference between the first thrust and the second thrust during hovering.

2. The unmanned aerial vehicle according to claim 1, wherein the controller, when performing the landing operation, is configured or programmed to cause a ratio of the first thrust to the second thrust to be greater than that during hovering, and then decreases the first thrust and the second thrust.

3. The unmanned aerial vehicle according to claim 1, wherein the controller, during hovering, is configured or programmed to cause the first thrust to be smaller than the second thrust.

4. The unmanned aerial vehicle according to claim 1, wherein the controller, when performing the landing operation, is configured or programmed to cause a ratio of the first thrust to the second thrust to be greater than that during hovering by increasing the first thrust, and then decrease the first thrust and the second thrust.

5. The unmanned aerial vehicle according to claim 1, wherein the controller, when performing the landing operation, is configured or programmed to cause a ratio of the first thrust to the second thrust to be greater than that during hovering by decreasing the second thrust, and then decrease the first thrust and the second thrust.

6. The unmanned aerial vehicle according to claim 1, wherein the controller, when performing the landing operation, is configured or programmed to cause a ratio of the first thrust to the second thrust to be greater than that during hovering by increasing the first thrust and decreasing the second thrust, and then decrease the first thrust and the second thrust.

7. The unmanned aerial vehicle according to claim 1, wherein the controller, when receiving a signal instructing landing, is configured or programmed to control the second type of rotation driver to decrease the rotation speed of the one or more second rotors.

8. The unmanned aerial vehicle according to claim 1, wherein the one or more first rotors are a plurality of first rotors;

the first type of rotation driver includes a plurality of electric motors to respectively drive the plurality of first rotors; and the second type of rotation driver is an internal combustion engine.

9. The unmanned aerial vehicle according to claim 8, wherein the controller, when receiving a signal instructing landing, is configured or programmed to decrease a rotation speed of the one or more second rotors by decreasing a rotation speed of the second type of rotation driver.

10. The unmanned aerial vehicle according to claim 1, wherein a diameter of the one or more second rotors is larger than a diameter of the one or more first rotors.

11. The unmanned aerial vehicle according to claim 1, wherein the one or more second rotors are used for thrust generation; and the one or more first rotors are used for thrust generation and attitude control.

12. The unmanned aerial vehicle according to claim 1, wherein the one or more second rotors generate greater thrust per rotation than the one or more first rotors.

13. The unmanned aerial vehicle according to claim 1, wherein the sum of the thrust generated by the one or more second rotors is greater than the sum of the thrust generated by the one or more first rotors.

14. The unmanned aerial vehicle according to claim 1, wherein a distance from a center of a body of the unmanned aerial vehicle to a rotation axis of each of the one or more second rotors is less than a distance from the center of the body to a rotation axis of each of the one or more first rotors.

15. The unmanned aerial vehicle according to claim 1, wherein an inertial force of the one or more second rotors is greater than an inertial force of the one or more first rotors.

16. A control method for an unmanned aerial vehicle including a plurality of rotors, the method comprising:

controlling rotation of the plurality of rotors by controlling a first type of rotation driver to drive one or more first rotors included in the plurality of rotors and a second type of rotation driver to drive one or more second rotors included in the plurality of rotors; and when performing a landing operation, generating a difference between a first thrust that is a sum of thrust generated by the one or more first rotors and a second thrust that is a sum of thrust generated by the one or more second rotors that is less than a difference between the first thrust and the second thrust during hovering.

17. The control method according to claim 16, further comprising:

when performing the landing operation, causing a ratio of the first thrust to the second thrust to be greater than that during hovering, and then decreasing the first thrust and the second thrust.

* * * * *